United States Patent
Hayashi et al.

(10) Patent No.: US 6,531,211 B1
(45) Date of Patent: *Mar. 11, 2003

(54) BLACK PLATE-SHAPED FERRITE COMPOSITE PARTICLES WITH MAGNET OPLUMBITE STRUCTURE AND MAGNETIC RECORDING MEDIUM USING THE SAME

(75) Inventors: Kazuyuki Hayashi, Hiroshima (JP); Hiroko Morii, Hiroshima (JP); Mamoru Kamigaki, Kure (JP); Yasuyuki Tanaka, Onoda (JP); Keisuke Iwasaki, Hiroshima (JP)

(73) Assignee: Toda Kogyo Corporation, Hiroshima-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/577,939

(22) Filed: May 25, 2000

Related U.S. Application Data

(63) Continuation-in-part of application No. 09/383,984, filed on Aug. 26, 1999, now abandoned.

(30) Foreign Application Priority Data

| Aug. 28, 1998 | (JP) | 10-243937 |
| Apr. 28, 1999 | (JP) | 11-121490 |
| Apr. 28, 1999 | (JP) | 11-121491 |
| Apr. 30, 1999 | (JP) | 11-125110 |

(51) Int. Cl.$^7$ .................... G11B 5/706; C01G 49/00
(52) U.S. Cl. ............... 428/323; 428/402; 428/403; 428/404; 428/405; 428/407; 428/694 BN; 106/287.12; 106/287.13; 252/62.56
(58) Field of Search ........... 106/287.12, 287.13; 428/403, 405, 694 BN, 323, 402, 404, 407, 900; 252/62.56

(56) References Cited

U.S. PATENT DOCUMENTS

| 4,076,890 | A | | 2/1978 | Yamada et al. | |
| 4,089,882 | A | * | 5/1978 | Takamizawa et al. | 556/479 |
| 4,482,623 | A | * | 11/1984 | Tabaru et al. | 430/137 |
| 4,822,850 | A | * | 4/1989 | Yashuda et al. | 528/28 |
| 5,137,783 | A | * | 8/1992 | Tanihara et al. | 428/407 |
| 5,286,291 | A | * | 2/1994 | Bernhardt et al. | 106/474 |
| 5,686,012 | A | * | 11/1997 | Hayashi et al. | 252/62.56 |
| 6,132,743 | A | * | 10/2000 | Kuroda et al. | 424/401 |
| 6,143,403 | A | * | 11/2000 | Ejiri et al. | 428/323 |

FOREIGN PATENT DOCUMENTS

| EP | 0699721 A2 | 3/1996 |
| EP | 0913431 A2 | 5/1999 |
| EP | 0924690 A2 | 6/1999 |
| EP | 0936507 A2 | 8/1999 |
| EP | 0957474 A1 | 11/1999 |
| JP | 57-88036 | 6/1982 |
| JP | 62-83305 | 4/1987 |
| JP | 62154228 | 7/1987 |
| JP | 02208821 | 8/1990 |
| JP | 04157615 | 5/1992 |

OTHER PUBLICATIONS

English Translation of JP–04–157615 (Mikio, May 1992).*

* cited by examiner

*Primary Examiner*—Vivian Chen
*Assistant Examiner*—Kevin M. Bernatz
(74) *Attorney, Agent, or Firm*—Nixon & Vanderhye P.C.

(57) ABSTRACT

Black plate-shaped ferrite composite particles with magnetoplumbite structure, particle size of 0.01 to 0.2 μm are surface coated with an organosilicon compound(s) and a carbon black coating is applied over the organosilicon coating layer. Optionally, a coating of silicon or aluminum oxide or hydroxide is provided on the surface of the black plate-shaped composite particles and below the organosilicon layer. The particles have a high blackness and when applied to a non-magnetic substrate with a binder resin to form a magnetic medium provide low light transmittance, low surface resistivity and a smooth surface.

30 Claims, No Drawings

BLACK PLATE-SHAPED FERRITE COMPOSITE PARTICLES WITH MAGNET OPLUMBITE STRUCTURE AND MAGNETIC RECORDING MEDIUM USING THE SAME

CROSS REFERENCE TO RELATED APPLICATION

This is a continuation-in-part of application, Ser. No. 09/383,984 filed Aug. 26, 1999, abandoned.

BACKGROUND OF THE INVENTION

The present invention relates to black plate-shaped ferrite composite particles with magnetoplumbite structure and a magnetic recording medium using the black plate-shaped ferrite composite particles with magnetoplumbite structure. More particularly, the present invention relates to black plate-shaped ferrite composite particles with magnetoplumbite structure which are excellent in dispersibility in a vehicle due to less amount of carbon black fallen-off from the surface of each black plate-shaped ferrite composite particles with magnetoplumbite structure, and have a high blackness and a low volume resistivity, and a magnetic recording medium capable of not only showing a low light transmittance and a low surface resistivity even when the amount of carbon black fine particles added to a magnetic recording layer thereof is as small as possible, but also having a smooth surface, by using the black plate-shaped ferrite composite particles with magnetoplumbite structure.

With a development of miniaturized, lightweight video or audio magnetic recording and reproducing apparatuses for long-time recording, magnetic recording media such as a magnetic tape and magnetic disk have been increasingly and strongly desired to have a higher performance, namely, a higher recording density, higher output characteristic, in particular, an improved frequency characteristic and a lower noise level.

Especially, video tapes have recently been desired more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

In order to enhance output characteristics of magnetic recording media, especially an S/N ratio thereof with respect to signals having a short wavelength, there have been demanded fineness of magnetic particles, reduction in thickness of a magnetic recording layer, high dispersibility of magnetic particles and surface smoothness of a magnetic coating film.

In general, as magnetic particles having a high coercive force, there are known magnetic metal particles containing iron as a main component, plate-shaped ferrite particles with magnetoplumbite structure, or the like.

Since the above-mentioned plate-shaped ferrite particles with magnetoplumbite structure are a stable oxide compound, there have been a large demand thereof especially in the field of data tapes which are required to retain recorded information for a long period of time.

However, it is also known that due to the fact that the plate-shaped ferrite particles with magnetoplumbite structure are a stable oxide compound, electrons therewithin are less movable, thereby exhibiting a volume resistivity as high as not less than $1.0 \times 10^8$ $\Omega \cdot cm$. When such plate-shaped ferrite particles with magnetoplumbite structure are used as magnetic particles for magnetic recording media, there arises such a disadvantage that the surface resistivity of the obtained magnetic recording media becomes too high, especially more than $1.0 \times 10^{12}$ $\Omega/sq$.

The magnetic recording media having such a high surface resistivity value cause problems such as attachment of cut chips, dusts or the like onto the surface thereof during the production process or upon use due to the increase in electrostatic charge amount, resulting in frequently generating drop-out. Therefore, in order to produce magnetic recording media whose surface resistivity value is reduced to not more than $10^{10}$ $\Omega/sq$, it has been strongly demanded to provide plate-shaped ferrite particles with magnetoplumbite structure which have a volume resistivity value as low as possible.

On the other hand, at the present time, the end position of a magnetic recording medium such as magnetic tapes has been detected by sensing a high light transmittance portion of the magnetic recording medium by means of a video deck. In the case where the particle size of magnetic particles dispersed in the magnetic recording layer become finer and the thickness of the magnetic recording medium is reduced in order to meet the requirement for high performance of the magnetic recording medium as described hereinbefore, the magnetic recording medium shows a high light transmittance as a whole, so that it has been difficult to detect the end position thereof by means of the video deck. In order to solve this problem, carbon black fine particles have been added to the magnetic recording layer in an amount of usually about 6 to 12 parts by weight based on 100 parts by weight of the magnetic particles, thereby reducing the light transmittance of the magnetic recording medium. For this reason, in current videotapes, it is indispensable to add carbon black fine particles, etc., to the magnetic recording layer thereof.

When a large amount of carbon black fine particles are added to the magnetic recording layer, the obtained magnetic recording media can show not only a low light transmittance but also a low surface resistivity value, because the carbon black fine particles are conductive particles. However, since the carbon black fine particles are fine particles having an average particle size as small as about 0.002 to about 0.05 $\mu m$, and have a large BET specific surface area and a low solvent-wettability, it is difficult to disperse these particles in vehicles. For this reason, it also becomes difficult to produce magnetic recording media having a smooth surface. In addition, since the addition of the large amount of such carbon black fine particles becomes to increase in amount of non-magnetic components in the magnetic recording layer, the obtained magnetic recording media is deteriorated in signal recording properties, thereby obstructing not only high-density recording but also reduction in thickness of the magnetic recording layer.

Consequently, it has been required to provide plate-shaped ferrite particles with magnetoplumbite structure having an excellent blackness and a low volume resistivity value in order to obtain magnetic recording media which can exhibit a sufficiently low surface resistivity value and a sufficiently low light transmittance even when the amount of carbon black fine particles added to the magnetic recording layer is reduced to a level as low as possible, especially less than 6 parts by weight based on 100 parts by weight of magnetic particles.

Hitherto, as methods of reducing the surface resistivity value of magnetic recording media using the plate-shaped ferrite particles with magnetoplumbite structure, there are known a method of adding a large amount of carbon fine particles to the magnetic recording layer, and a method of lowering the volume resistivity value of the magnetic particles per se, as described hereinabove. As the method of lowering the volume resistivity value, there are known a method of incorporating $Fe^{2+}$ into plate-shaped hexagonal ferrite particles (Japanese Patent Application Laid-Open (KOKAI) Nos. 62-154228(1987) and 2-208821(1990), etc.), a method of depositing 2 to 20% by weight of carbon onto the surfaces of particles by heat-treating plate-shaped hexagonal ferrite particles at a temperature of 100 to 450° C. by a hydrogen gas stream and then treating the reduced particles under a carbon dioxide gas stream (Japanese Patent Application Laid-Open (KOKAI) No. 4-157615(1992), etc.), or the like.

At the present time, it has been most strongly demanded to provide plate-shaped ferrite particles with magnetoplumbite structure, which show an excellent blackness and a low volume resistivity value. However, such plate-shaped ferrite particles with magnetoplumbite structure, which can satisfy these properties have not been obtained yet.

That is, the above-mentioned $Fe^{2+}$-containing plate-shaped hexagonal ferrite particles show a low volume resistivity value. However, as shown in Comparative Examples hereinafter, since the plate-shaped hexagonal ferrite particles are unsatisfactory in blackness, magnetic recording media obtained by using these particles cannot show a sufficiently low light transmittance. In addition, because of the inclusion of $Fe^{2+}$, these particles are deteriorated in dispersibility in vehicles, so that it is difficult to obtain a magnetic recording layer having a smooth surface. Further, the plate-shaped hexagonal ferrite particles are deteriorated in oxidation stability, and tends to suffer from change in coercive force value with the passage of time due to the fact that $Fe^{2+}$ contained therein is readily oxidized into $Fe^{3+}$.

The above-mentioned carbon-deposited plate-shaped hexagonal ferrite particles exhibit an excellent blackness and a low volume resistivity value. However, because of the production process including heat-treating the plate-shaped hexagonal ferrite particles under a hydrogen gas stream, the obtained particles inevitably contain $Fe^{2+}$ as shown in Comparative Examples hereinafter. Accordingly, the carbon-deposited plate-shaped hexagonal ferrite particles also have the same defects as described above, i.e., suffer from change in coercive force value with the passage of time. In addition, since the adhesion force of carbon particles onto the surfaces of the plate-shaped hexagonal ferrite particles is weak, carbon particles tend to be desorbed or fallen-off therefrom when the particles are dispersed in vehicles. As a result, the dispersibility of the particles in vehicles is deteriorated, so that the obtained magnetic recording media show a large light transmittance and are unsatisfactory in surface smoothness as shown in Comparative Examples hereinafter.

As a result of the present inventors' earnest studies, it has been found that by forming on a surface of each plate-shaped ferrite particle with magnetoplumbite structure a coating layer comprising at least one organosilicon compound selected from the group consisting of:

(1) organosilane compounds obtainable from an alkoxysilane compound, (2) polysiloxanes or modified polysiloxanes, and (3) fluoroalkyl organosilane compounds obtainable from a fluoroalkylsilane compound, and forming on the surface of the organosilicon coating layer a carbon black coating in an amount of 0.5 to 10 parts by weight based on 100 parts by weight of said plate-shaped ferrite particles with magnetoplumbite structure.

The thus obtained black plate-shaped ferrite composite particles with magnetoplumbite structure, having an average particle size of 0.01 to 0.2 μm, are useful as magnetic particles for high-density magnetic recording media, because the black plate-shaped ferrite composite particles with magnetoplumbite structure can exhibit a high blackness and a low volume resistivity value without containing almost $Fe^{2+}$, and have an excellent dispersibility, thereby enabling the production of such magnetic recording media which show a low light transmittance and a low surface resistivity value even when the amount of carbon black fine particles added to the magnetic recording layer thereof is reduced to a level as low as possible, and which are excellent in surface smoothness. The present invention has been attained based on the finding.

SUMMARY OF THE INVENTION

It is an object of the present invention to provide plate-shaped ferrite particles with magnetoplumbite structure, which can exhibit a high blackness and a low volume resistivity value without containing $Fe^{2+}$ thereinto.

It is another object of the present invention to provide a magnetic recording medium capable of showing a low light transmittance, a low surface resistivity value and an excellent surface smoothness.

To accomplish the aims, in a first aspect of the present invention, there are provided black plate-shaped ferrite composite particles with magnetoplumbite structure, having an average particle size of 0.01 to 0.2 μm, comprising:

plate-shaped ferrite particles with magnetoplumbite structure;

a coating layer formed on surface of the plate-shaped ferrite particles with magnetoplumbite structure, comprising at least one organosilicon compound selected from the group consisting of:

(1) organosilane compounds obtainable from an alkoxysilane compounds, (2) polysiloxanes or modified polysiloxanes, and (3) fluoroalkyl organosilane compounds obtainable from a fluoroalkylsilane compounds; and a carbon black coating formed on the coating layer comprising the organosilicon compound, in an amount of 0.5 to 10 parts by weight based on 100 parts by weight of the plate-shaped ferrite particles with magnetoplumbite structure.

In a second aspect of the present invention, there are black plate-shaped ferrite composite particles with magnetoplumbite structure, having an average particle size of 0.01 to 0.2 μm, comprising:

plate-shaped ferrite particles with magnetoplumbite structure;

a coating formed on at least part of the surface of the plate-shaped ferrite particles with magnetoplumbite structure, comprising at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the coated plate-shaped ferrite particles with magnetoplumbite structure;

an organosilicon coating layer formed on the surface of the oxide or hydroxide coating, comprising at least one organosilicon compound selected from the group consisting of:

(1) organosilane compounds obtainable from an alkoxysilane compounds,
(2) polysiloxanes or modified polysiloxanes, and
(3) fluoroalkyl organosilane compounds obtainable from a fluoroalkylsilane compounds; and
   a carbon black coating formed on the organosilicon coating layer comprising the organosilicon compound, in an amount of 0.5 to 10 parts by weight based on 100 parts by weight of the plate-shaped ferrite particles with magnetoplumbite structure.

In a third aspect of the present invention, there is provided a magnetic recording medium comprising:
a non-magnetic base film; and
a magnetic recording layer comprising a binder resin and black plate-shaped ferrite composite particles with magnetoplumbite structure, having an average particle size of 0.01 to 0.2 μm, comprising:
   plate-shaped ferrite particles with magnetoplumbite structure;
   an organosilicon coating layer formed on surface of the plate-shaped ferrite particles with magnetoplumbite structure, comprising at least one organosilicon compound selected from the group consisting of:
      (1) organosilane compounds obtainable from an alkoxysilane compounds,
      (2) polysiloxanes or modified polysiloxanes, and
      (3) fluoroalkyl organosilane compounds obtainable from a fluoroalkylsilane compounds; and
         a carbon black coating formed on the organosilicon coating layer, in an amount of 0.5 to 10 parts by weight based on 100 parts by weight of the plate-shaped ferrite particles with magnetoplumbite structure.

In a fourth aspect of the present invention, there is provided a magnetic recording medium comprising:
a non-magnetic base film; and
a magnetic recording layer comprising a binder resin and black plate-shaped ferrite composite particles with magnetoplumbite structure, having.an average particle size of 0.01 to 0.2 μm, comprising:
   plate-shaped ferrite particles with magnetoplumbite structure;
   an oxide or hydroxide coating formed on at least part of the surface of the plate-shaped ferrite particles with magnetoplumbite structure, comprising at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the coated plate-shaped ferrite particles with magnetoplumbite structure;
   an organosilicon coating layer formed on the surface of the oxide or hydroxide coating, comprising at least one organosilicon compound selected from the group consisting of:
      (1) organosilane compounds obtainable from an alkoxysilane compounds,
      (2) polysiloxanes or modified polysiloxanes, and
      (3) fluoroalkyl organosilane compounds obtainable from a fluoroalkylsilane compounds; and
         a carbon black coating formed on the organosilicon coating layer, in an amount of 0.5 to 10 parts by weight based on 100 parts by weight of the plate-shaped ferrite particles with magnetoplumbite structure.

DETAILED DESCRIPTION OF THE INVENTION

First, the black plate-shaped ferrite composite particles with magnetoplumbite structure according to the present invention which are useful as magnetic particles for magnetic recording media, are explained.

The black plate-shaped ferrite composite particles with magnetoplumbite structure according to the present invention, have an average particle size of 0.01 to 0.2 μm, and comprise plate-shaped ferrite particles with magnetoplumbite structure as core particles, a coating layer comprising an organosilicon compound which is formed on the surface of each plate-shaped ferrite particles with magnetoplumbite structure, and carbon black coat which are formed on the coating layer comprising the organosilicon compound.

As the plate-shaped ferrite particles with magnetoplumbite structure which are used as core particles in the present invention, there may be exemplified plate-shaped ferrite particles with magnetoplumbite structure, which contain Ba, Sr or both Ba and Sr; plate-shaped ferrite particles with magnetoplumbite structure which further contain, in addition to Ba and/or Sr, at least one coercive force-reducing agent selected from the group consisting of divalent or tetravalent metals such as Co, Ni, Zn, Mn, Mg, Ti, Nb, Cu, Zr, Mo and Sn; or the like.

The above-mentioned plate-shaped ferrite particles with magnetoplumbite structure used in the present invention, has a composition represented by the general formula:

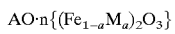

$$AO \cdot n\{(Fe_{1-a}M_a)_2O_3\}$$

wherein A is Ba, Sr or Ba—Sr; M is at least one element selected from the group consisting of Co, Ni, Zn, Mn, Mg, Ti, Nb, Cu, Zr, Mo and Sn ; n is a number of 5.5 to 6.5; and a is a number of 0 to 0.5.

The average particle diameter (average plate diameter) of the plate-shaped ferrite particles with magnetoplumbite structure as core particles used in the present invention is usually 0.009 to 0.18 μm, preferably 0.019 to 0.18 μm, more preferably 0.027 to 0.18 μm.

When the average particle diameter of the plate-shaped ferrite particles with magnetoplumbite structure is more than 0.18 μm, the obtained black plate-shaped ferrite composite particles with magnetoplumbite structure also may become large particles. In the case where such large particles are used for forming a magnetic recording layer, the surface smoothness of the magnetic recording layer tends to be deteriorated. On the other hand, when the average particle size is less than 0.009 μm, the intermolecular force between the particles may be increased due to the reduction in particle size, so that agglomeration of the particles tends to be caused. Therefore, it becomes difficult to uniformly coat the surfaces of the plate-shaped ferrite particles with magnetoplumbite structure with the organosilicon compound, and to uniformly form the carbon black coat on the surface of the coating layer comprising the organosilicon compounds.

The average thickness of the plate-shaped ferrite particles with magnetoplumbite structure as core particles is preferably 0.0005 to 0.045 μm, more preferably 0.0009 to 0.045 μm, still more preferably 0.0014 to 0.045.

When the average thickness of the plate-shaped ferrite particles with magnetoplumbite structure is more than 0.045 μm, the obtained black plate-shaped ferrite composite particles with magnetoplumbite structure also may become large particles. In the case where such large particles are used for forming a magnetic recording layer, the surface smoothness of the magnetic recording layer may tend to be deteriorated. On the other hand, when the average thickness is less than 0.0005 μm, the intermolecular force between the particles may be increased due to the reduction in particle size, so that agglomeration of the particles may tend to be caused. Therefore, it may become difficult to uniformly coat the surfaces of the plate-shaped ferrite particles with magnetoplumbite structure with the organosilicon compound, and to uniformly form the carbon black coat on the surface of the coating layer comprising the organosilicon compounds.

The BET specific surface area of the plate-shaped ferrite particles with magnetoplumbite structure as core particles is preferably 30 to 200 m$^2$/g, more preferably 35 to 150 m$^2$/g, still more preferably 38 to 100 m$^2$/.

When the BET specific surface area of the plate-shaped ferrite particles with magnetoplumbite structure is less than 30 m$^2$/g, the obtained black plate-shaped ferrite composite particles with magnetoplumbite structure also may become large particles. In the case where such large particles are used for forming a magnetic recording layer, the surface smoothness of the magnetic recording layer may tend to be deteriorated. On the other hand, when the BET specific surface area is more than 200 m$^2$/g, the intermolecular force between the particles may be increased due to the reduction in particle size, so that agglomeration of the particles may tend to be caused. Therefore, it may become difficult to uniformly coat the surfaces of the plate-shaped ferrite particles with magnetoplumbite structure with the organosilicon compound, and to uniformly form the carbon black coat on the surface of the coating layer comprising the organosilicon.compounds.

The plate-shaped ferrite particles with magnetoplumbite structure used in the present invention have a plate ratio (ratio of average particle size to average thickness; hereinafter referred to merely as "plate ratio") of preferably 2.0:1 to 20.0:1, more preferably 2.5:1 to 15.0:1, still more preferably 3.0:1 to 10.0:1. When the plate ratio is more than 20.0:1, the stacking between particles may be frequently caused, so that it may become difficult to uniformly coat the surfaces of the plate-shaped ferrite particles with magnetoplumbite structure with the organosilicon compound, and then uniformly form the carbon black coat thereon. On the other hand, when the plate ratio is less than 2.0:1, the film strength of the obtained magnetic recording media may be deteriorated.

The geometrical standard deviation value of the particle diameter (plate diameter) of the plate-shaped ferrite particles with magnetoplumbite structure as core particles used in the present invention is preferably not more than 1.7, more preferably not more than 1.6. When the geometrical standard deviation value thereof is more than 1.7, coarse particles may be contained therein, so that the plate-shaped ferrite particles with magnetoplumbite structure may be inhibited from being uniformly dispersed. Therefore, it also may become difficult to uniformly coat the surfaces of the plate-shaped ferrite particles with magnetoplumbite structure with the organosilicon compounds and to uniformly form the carbon black coat on the surface of the coating layer comprising the organosilicon compounds. The lower limit of the geometrical standard deviation value is 1.01. It is industrially difficult to obtain particles having a geometrical standard deviation value of less than 1.01.

The blackness of the plate-shaped ferrite particles with magnetoplumbite structure as core particles used in the present invention, is usually more than 18.0 when represented by L*value, and the upper limit thereof is preferably 34.0, more preferably 33.0 when represented by L*value. When the L*value exceeds 34.0, the lightness of the particles may be high, so that it is difficult to obtain black plate-shaped ferrite composite particles with magnetoplumbite structure having a sufficient blackness.

The volume resistivity of the plate-shaped ferrite particles with magnetoplumbite structure as core particles used in the present invention is usually not less than 1.0×10$^8$ Ω·cm. The upper limit thereof is usually about 1.0×10$^{10}$ Ω·cm.

As to the magnetic properties of the plate-shaped ferrite particles with magnetoplumbite structure as core particles used in the present invention, the coercive force value thereof is preferably 500 to 4,000 Oe, more preferably 650 to 4,000 Oe, the saturation magnetization value is preferably 40 to 70 emu/g, more preferably 45 to 70 emu/g.

The particle shape and particle size of the black plate-shaped ferrite composite particles with magnetoplumbite structure according to the present invention are considerably varied depending upon those of plate-shaped ferrite particles with magnetoplumbite structure as core particles. The black plate-shaped ferrite composite particles with magnetoplumbite structure have a similar particle shape to that of the plate-shaped ferrite particles with magnetoplumbite structure as core particle, and a slightly larger particle size than that of the plate-shaped ferrite particles with magnetoplumbite structure as core particles.

More specifically, the black plate-shaped ferrite composite particles with magnetoplumbite structure according to the present invention, have an average particle diameter (average plate diameter) of usually 0.01 to 0.2 μm.

When the average particle size of the black plate-shaped ferrite composite particles with magnetoplumbite structure is more than 0.2 μm, the black plate-shaped ferrite composite particles with magnetoplumbite structure may become coarse and as a result, the obtained coating film may become to be deteriorated in surface smooth. On the other hand, when the average particle size thereof is less than 0.01 μm, the black plate-shaped ferrite composite particles with magnetoplumbite structure tends to be agglomerated by the increase of intermolecular force due to the reduction in particle size, thereby deteriorating the dispersibility in a vehicle upon production of the magnetic coating composition. In the consideration of the surface smoothness of the obtained coating film and the dispersibility in vehicles upon the production of magnetic coating compositions, the average particle size of the black plate-shaped ferrite composite particles with magnetoplumbite structure is preferably 0.02 to 0.2 μm, more preferably 0.03 to 0.2 μm.

The black plate-shaped ferrite composite particles with magnetoplumbite structure according to the present invention, have a thickness of usually 0.0005 to 0.05 μm.

When the average thickness of the black plate-shaped ferrite composite particles with magnetoplumbite structure is more than 0.05 μm, the black plate-shaped ferrite composite particles with magnetoplumbite structure may become coarse and as a result, the obtained coating film may become to be deteriorated in surface smooth. On the other hand, when the average thickness thereof is less than 0.0005 μm, the black plate-shaped ferrite composite particles with magnetoplumbite structure may tend to be agglomerated by the increase of intermolecular force due to the reduction in particle size, thereby deteriorating the dispersibility in a vehicle upon production of the magnetic coating composition. In the consideration of the surface smoothness of the obtained coating film and the dispersibility in vehicles upon the production of magnetic coating compositions, the average thickness of the black plate-shaped ferrite composite particles with magnetoplumbite structure is preferably 0.001 to 0.05 μm, more preferably 0.0015 to 0.05 μm.

The black plate-shaped ferrite composite particles with magnetoplumbite structure according to the present invention, have a plate ratio of usually 2.0:1 to 20.0:1.

When the plate ratio of the black plate-shaped ferrite composite particles with magnetoplumbite structure is more than 20.0:1, the black plate-shaped ferrite composite particles with magnetoplumbite structure may tend to be frequently stacking between particles. As a result, upon the production of a magnetic coating composition, there is tendency that the dispersibility of the particles in vehicle is deteriorated and the viscosity of the obtained magnetic coating composition is increased. On the other hand, when the average thickness thereof is less than 2.0:1, the strength of the coating film of the obtained magnetic recording medium is low. In the consideration of the film strength of the obtained magnetic recording media and the dispersibility in vehicles upon the production of magnetic coating compositions, the plate ratio is preferably 2.5:1 to 15.0:1, more preferably 3.0:1 to 10.0:1.

The BET specific surface area of the black plate-shaped ferrite composite particles with magnetoplumbite structure according to the present invention, is preferably 30 to 200 m²/g, more preferably 35 to 150 m²/g, still more preferably 38 to 100 m²/g. When the BET specific surface area thereof is less than 30 m²/g, the black plate-shaped ferrite composite particles with magnetoplumbite structure may become coarse, and the sintering between the black plate-shaped ferrite composite particles with magnetoplumbite structure may be caused, thereby deteriorating the surface smooth of the magnetic recording layer. On the other hand, when the BET specific surface area is more than 200 m²/g, the black plate-shaped ferrite composite particles with magnetoplumbite structure may tend to be agglomerated together by the increase in intermolecular force due to the reduction in particle size, thereby deteriorating the dispersibility in the vehicle upon production of the magnetic coating composition.

The geometrical standard deviation value of the black plate-shaped ferrite composite particles with magnetoplumbite structure according to the present invention is preferably not more than 1.7. When the geometrical standard deviation value thereof is more than 1.7, the surface smooth of the magnetic recording layer of the magnetic recording medium may be likely to be deteriorated due to the existence of coarse particles therein. With the consideration of the surface smooth of the magnetic recording layer, the geometrical standard deviation value thereof is more preferably not more than 1.6, still more preferably not more than 1.5. In the consideration of the industrial productivity, the lower limit of the geometrical standard deviation value thereof is preferably 1.01. It is industrially difficult to obtain such particles having a geometrical standard deviation of less than 1.01.

The volume resistivity of the black plate-shaped ferrite composite particles with magnetoplumbite structure is preferably less than $1.0 \times 10^8$ Ω·cm, more preferably $1.0 \times 10^5$ to $5.0 \times 10^7$ Ω·cm, still more preferably $1.0 \times 10^5$ to $1.0 \times 10^7$ Ω·cm. When the volume resistivity of the black plate-shaped ferrite composite particles with magnetoplumbite structure is not less than $1.0 \times 10^8$ Ω·cm, it may be difficult to sufficiently reduce the surface resistivity of the obtained magnetic recording medium.

As to the blackness of the black plate-shaped ferrite composite particles with magnetoplumbite structure according to the present invention, the upper limit of the blackness thereof is usually 27.0, preferably 26.0, more preferably 25.0 when represented by L*value. When the L*value thereof is more than 27.0, the lightness of the black plate-shaped ferrite composite particles with magnetoplumbite structure becomes high, so that the blackness of the black plate-shaped ferrite composite particles with magnetoplumbite structure is insufficient. The lower limit of the blackness thereof is 15 when represented by L*value.

The percentage of desorption of carbon black from the black plate-shaped ferrite composite particles with magnetoplumbite structure according to the present invention, is preferably not more than 20%, more preferably not more than 10%. When the desorption percentage of the carbon black is more than 20%, the desorbed carbon black may tend to hinder the black plate-shaped ferrite composite particles with magnetoplumbite structure from being uniformly dispersed in the vehicle upon production of the magnetic coating composition.

The black plate-shaped ferrite composite particles with magnetoplumbite structure, have a ratio of $Fe^{2+}$ to $Fe^{3+}$ (hereinafter referred to merely as "$Fe^{2+}/Fe^{3+}$ ratio") of usually not more than 0.01:1, preferably not more than 0.005:1. When the $Fe^{2+}/Fe^{3+}$ ratio is more than 0.01:1, since $Fe^{2+}$ tends to be oxidized into $Fe^{3+}$, the coercive force value of the black plate-shaped ferrite composite particles with magnetoplumbite structure tends to vary with the passage of time. The lower limit of the $Fe^{2+}/Fe^{3+}$ is zero (0).

As the magnetic properties of the black plate-shaped ferrite composite particles with magnetoplumbite structure according to the present invention, the coercive force of the black plate-shaped ferrite composite particles with magnetoplumbite structure is preferably 500 to 4,000 Oe, more preferably 650 to 4,000 Oe, the saturation magnetization thereof is preferably 40 to 70 emu/g, more preferably 45 to 70 emu/g.

The percentage of change in coercive force value of the black plate-shaped ferrite composite particles with magnetoplumbite structure is preferably not more than 3%, more preferably not more than 2%.

The coating layer formed on the surface of the core particle comprises at least one organosilicon compound selected from the group consisting of (1) organosilane compounds obtainable from alkoxysilane compounds; (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes"); and (3) fluoroalkyl organosilane compounds obtainable from fluoroalkylsilane compounds.

The organosilane compounds (1) may be produced by drying or heat-treating alkoxysilane compounds represented by the formula (I):

$$R^1{}_a SiX_{4-a} \tag{I}$$

wherein $R^1$ is $C_6H_5$—, $(CH_3)_2CHCH_2$— or n-$C_bH_{2b+1}$ (wherein b is an integer of 1 to 18); X is $CH_3O$— or $C_2H_5O$—; and a is an integer of 0 to 3.

The drying or heat-treatment of the alkoxysilane compounds may be conducted, for example, at a temperature of usually 40 to 200° C., preferably 60 to 150° C. for usually 10 minutes to 12 hours, preferably 30 minutes to 3 hours.

Specific examples of the alkoxysilane compounds may include methyl triethoxysilane, dimethyl diethoxysilane, phenyl triethyoxysilane, diphenyl diethoxysilane, methyl trimethoxysilane, dimethyl dimethoxysilane, phenyl trimethoxysilane, diphenyl dimethoxysilane, isobutyl trimethoxysilane, decyl trimethoxysilane or the like. Among these alkoxysilane compounds, in view of the desorption percentage and the coating effect of carbon black, methyl triethoxysilane, phenyl triethyoxysilane, methyl trimethoxysilane, dimethyl dimethoxysilane and isobutyl trimethoxysilane are preferred, and methyl triethoxysilane and methyl trimethoxysilane are more preferred.

As the polysiloxanes (2), there may be used those compounds represented by the formula (II):

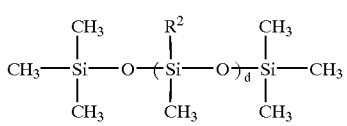
(II)

wherein $R^2$ is H— or $CH_3$—, and d is an integer of 15 to 450.

Among these polysiloxanes, in view of the desorption percentage and the coating effect of carbon black, polysiloxanes having methyl hydrogen siloxane units are preferred.

As the modified polysiloxanes (2-A), there may be used:

(a) polysiloxanes modified with polyethers represented by the formula (III):

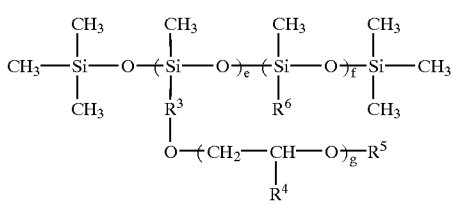
(III)

wherein $R^3$ is —$(-CH_2-)_h$—; $R^4$ is —$(-CH_2-)_i$—$CH_3$; $R^5$ is —OH, —COOH, —CH=$CH_2$, —C($CH_3$)=$CH_2$ or —$(-CH_2-)_j$—$CH_3$; $R^6$ is —$(-CH_2-)_k$—$CH_3$; g and h are an integer of 1 to 15; i, j and k are an integer of 0 to 15; e is an integer of 1 to 50; and f is an integer of 1 to 300;

(b) polysiloxanes modified with polyesters represented by the formula (IV):

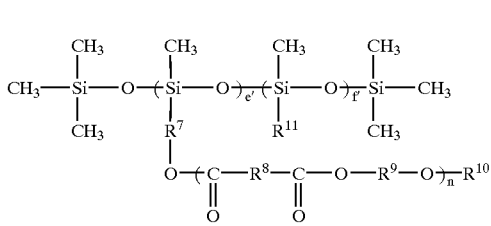
(IV)

wherein $R^7$, $R^8$ and $R^9$ are —$(-CH_2-)_q$— and may be the same or different; $R^{10}$ is —OH, —COOH, —CH=$CH_2$, —C($CH_3$)=$CH_2$ or —$(-CH_2-)_r$—$CH_3$; $R^{11}$ is —$(-CH_2-)_s$—$CH_3$; n and q are an integer of 1 to 15; r and s are an integer of 0 to 15; e' is an integer of 1 to 50; and f' is an integer of 1 to 300;

(c) polysiloxanes modified with epoxy compounds represented by the formula (V):

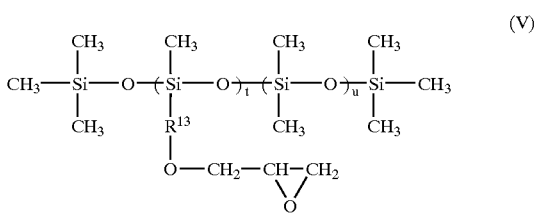
(V)

wherein $R^{12}$ is —$(-CH_2-)_v$—; v is an integer of 1 to 15; t is an integer of 1 to 50; and u is an integer of 1 to 300; or a mixture thereof.

Among these modified polysiloxanes (2-A), in view of the desorption percentage and the coating effect of carbon black, the polysiloxanes modified with the polyethers represented by the formula (III), are preferred.

As the terminal-modified polysiloxanes (2-B), there may be used those represented by the formula (VI):

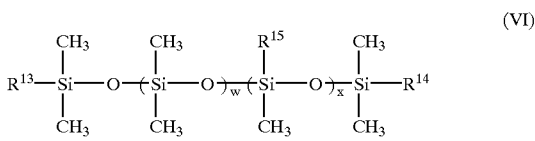
(VI)

wherein $R^{13}$ and $R^{14}$ are —OH, $R^{16}$OH or $R^{17}$COOH and may be then same or different; $R^{15}$ is —$CH_3$ or —$C_6H_5$; $R^{16}$ and $R^{17}$ are —$(-CH_2-)_y$—; y is an integer of 1 to 15; w is an integer of 1 to 200; and x is an integer of 0 to 100.

Among these terminal-modified polysiloxanes, in view of the desorption percentage and the coating effect of carbon black, the polysiloxanes whose terminals are modified with carboxylic acid groups are preferred.

The fluoroalkyl organosilane compounds (3) may be produced by drying or heat-treating fluoroalkylsilane compounds represented by the formula (VII):

$CF_3(CF_2)_zCH_2CH_2(R^{18})_{a'}SiX_{4-a'}$. (VII)

wherein $R^{18}$ is $CH_3$—, $C_2H_5$—, $CH_3O$— or $C_2H_5O$—; X is $CH_3O$— or $C_2H_5O$—; and z is an integer of 0 to 15; and a' is an integer of 0 to 3.

The drying or the heat-treatment of the fluoroalkylsilane compounds may be conducted, for example, at a temperature of usually 40 to 200° C., preferably 60 to 150° C. for usually 10 minutes to 12 hours, preferably 30 minutes to 3 hours.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, heptadecafluorodecylmethyl diethoxysilane or the like. Among these fluoroalkylsilane compounds, in view of the desorption percentage and the coating effect of carbon black, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

The coating amount of the organosilicon compounds is usually 0.02 to 5.0% by weight, preferably 0.03 to 4.0% by weight, more preferably 0.05 to 3.0% by weight (calculated as Si) based on the weight of the plate-shaped ferrite particles with magnetoplumbite structure coated with the organosilicon compounds.

When the coating amount of the organosilicon compounds is less than 0.02% by weight, it becomes difficult to form the carbon black coat on the surfaces of the plate-shaped ferrite particles with magnetoplumbite structure in such an amount enough to improve the blackness of the obtained black plate-shaped ferrite composite particles with magnetoplumbite structure.

On the other hand, when the coating amount of the organosilicon compounds is more than 5.0% by weight, a sufficient amount of the carbon black coat can be formed on the surfaces of the plate-shaped ferrite particles with magnetoplumbite structure. However, the use of such unnecessarily large amount of the organosilicon compounds is meaningless because the effect of enhancing the blackness of the obtained black plate-shaped ferrite composite particles with magnetoplumbite structure is already saturated.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA-100, MA7, #1000, #2400B, #30, MA8, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN INTERNATIONAL CO., LTD.), BLACK PEARLS-L, BLACK PEARLS 1000, BLACK PEARLS 4630, VULCAN XC72, REGAL 660, REGAL 400, etc. (tradename, produced by CABOTT SPECIALTY CHEMICALS INK CO., LTD.), or the like. In view of the compatibility with the organosilicon compounds, MA-100, MA7, #1000, #2400B, #30, BLACK PEARLS-L and BLACK PEARLS 4630 are preferred.

The lower limit of the average particle size of the carbon black fine particles used is usually 0.002 $\mu$m, preferably 0.0025 $\mu$m, and upper limit thereof is usually 0.05 $\mu$m, preferably 0.035 $\mu$m. When the average particle size of the carbon black fine particles used is less than 0.002 $\mu$m, the carbon black fine particles used are too fine to be well handled.

On the other hand, when the average particle size thereof is more than 0.05 $\mu$m since the particle size of the carbon black fine particles used is much larger, it is necessary to apply a larger mechanical shear force for forming the uniform carbon black coat on the coating layer composed of the organosilicon compounds, thereby rendering the coating process industrially disadvantageous.

The amount of the carbon black coat is 0.5 to 10 parts by weight based on 100 parts by weight of the plate-shaped ferrite particles with magnetoplumbite structure as core particles.

When the amount of the carbon black coat formed is less than 0.5 part by weight, the amount of the carbon black may be insufficient, so that it becomes difficult to obtain black plate-shaped ferrite composite particles with magnetoplumbite structure having a sufficient blackness and lower volume resistivity.

On the other hand, when the amount of the carbon black coat is more than 10 parts by weight, the obtained black plate-shaped ferrite composite particles with magnetoplumbite structure can show a sufficient blackness and volume resistivity. However, since the amount of the carbon black is considerably large, the carbon black tend to be desorbed from the coating layer composed of the organosilicon compound. As a result, the obtained black plate-shaped ferrite composite particles with magnetoplumbite structure tend to be deteriorated in dispersibility in a vehicle upon the production of magnetic coating composition.

The thickness of carbon black coat formed is preferably not more than 0.04 $\mu$m, more preferably not more than 0.03 $\mu$m, still more preferably not more than 0.02 $\mu$m The lower limit thereof is more preferably 0.0001 $\mu$m.

At least a part of the surface of the plate-shaped ferrite particles with magnetoplumbite structure as a core particle used in the present invention may be coated with at least one selected from the group consisting of a hydroxide of aluminum, an oxide of aluminum, a hydroxide of silicon and an oxide of silicon (hereinafter referred to as "hydroxides and/or oxides of aluminum and/or silicon coat"). When the black plate-shaped ferrite composite particles with magnetoplumbite structure obtained by using as core particles the plate-shaped ferrite particles with magnetoplumbite structure which are coated with the hydroxides and/or oxides of aluminum and/or silicon, are dispersed in a vehicle, since the treated particles have an affinity with the binder resin, it is more easy to obtain a desired dispersibility.

The amount of the hydroxides and/or oxides of aluminum and/or silicon coat is usually not more than 20% by weight, preferably 0.01 to 20% by weight, more preferably 0.05 to 10% by weight (calculated as Al and/or $SiO_2$) based on the total weight of the coated plate-shaped ferrite particles with magnetoplumbite structure. If it is less than 0.01% by weight (calculated as Al and/or $SiO_2$) based on the total weight of the coated plate-shaped ferrite particles with magnetoplumbite structure, the dispersibility-improving effect by coating therewith may be insufficient. If the amount exceeds 20% by weight (calculated as Al and/or $SiO_2$) based on the total weight of the coated plate-shaped ferrite particles with magnetoplumbite structure, the dispersibility-improving effect by coating therewith becomes saturated, so that it is meaningless to add a coating material more than necessary.

The black plate-shaped ferrite composite particles with magnetoplumbite structure according to the present invention wherein the plate-shaped ferrite particles with magnetoplumbite structure which are coated with at least one selected from the group consisting of a hydroxide of aluminum, an oxide of aluminum, a hydroxide of silicon and an oxide of silicon are used as core particles, are substantially identical in particle size, geometrical standard deviation, BET specific surface area value, volume resistivity value, blackness L*value, magnetic properties, desorption percentage of carbon black, $Fe^{2+}/Fe^{3+}$ and percentage of change in coercive force value with the passage of time, to those of the black plate-shaped ferrite composite particles with magnetoplumbite structure according to the present invention which are uncoated with the hydroxide and/or oxide of aluminum and/or silicon.

Next, the magnetic recording medium according to the present invention is described.

The magnetic recording medium according to the present invention comprises:

a non-magnetic substrate; and a magnetic recording layer formed on the non-magnetic substrate, comprising a binder resin and the black plate-shaped ferrite composite particles with magnetoplumbite structure.

As the non-magnetic base film, the following materials which are at present generally used for the production of a magnetic recording medium may be used: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 μm, preferably 2.0 to 200 μm.

In the case of a magnetic disc, polyethylene terephthalate is usually used as the non-magnetic base film, and the thickness thereof is usually 50 to 300 μm preferably 60 to 200 μm. In a magnetic tape, when polyethylene terephthalate is used as the non-magnetic base film, the thickness thereof is usually 3 to 100 μm, preferably 4 to 20 μm; when polyethylene naphthalate is used, the thickness thereof is usually 3 to 50 μm, preferably 4 to 20 μm; and when polyamide is used, the thickness thereof is usually 2 to 10 μm, preferably 3 to 7 μm.

As the binder resin used in the present invention, the following resins which are at present generally used for the production of a magnetic recording medium may be used: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof.

Each of these resin binders may contain a functional group such as —OH, —COOH, —SO$_3$M, —OPO$_2$M$_2$ and —NH$_2$, wherein M represents H, Na or K. With the consideration of the dispersibility of the black plate-shaped ferrite composite particles with magnetoplumbite structure, a binder resin containing a functional group —COOH or —SO$_3$M is preferable.

The thickness of the magnetic recording layer obtained by applying the magnetic coating composition on the surface of the non-magnetic substrate and dried, is usually in the range of 0.01 to 5.0 μm. If the thickness is less than 0.01 μm, uniform coating may be difficult, so that unfavorable phenomenon such as unevenness on the coating surface is observed. On the other hand, when the thickness exceeds 5.0 μm, it may be difficult to obtain desired signal recording property due to an influence of diamagnetism. The preferable thickness is in the range of 0.1 to 4.0 μm.

The mixing amount of the black plate-shaped ferrite composite particles with magnetoplumbite structure to the binder resin is usually 5 to 2000 parts by weight, preferably 100 to 1000 parts by weight based on 100 parts by weight of the binder resin.

When the amount of the black plate-shaped ferrite composite particles with magnetoplumbite structure blended is less than 5 parts by weight, the obtained magnetic coating composition contains a too small amount of the black plate-shaped ferrite composite particles with magnetoplumbite structure. As a result, when a coating film is produced from such a magnetic coating composition, it is not possible to obtain a coating film in which the black plate-shaped ferrite composite particles with magnetoplumbite structure are continuously dispersed, so that the surface smoothness and the strength of the coating film become unsatisfactory. On the other hand, when the amount of the black plate-shaped ferrite composite particles with magnetoplumbite structure blended is more than 2,000 parts by weight, the amount of the black plate-shaped ferrite composite particles with magnetoplumbite structure becomes too large relative to that of the binder resin, so that it is not possible to sufficiently disperse the black plate-shaped ferrite composite particles with magnetoplumbite structure in the magnetic coating composition. As a result, when a coating film is produced from such a magnetic coating composition, it is difficult to obtain a coating film having a sufficiently smooth surface. Further, since the black plate-shaped ferrite composite particles with magnetoplumbite structure cannot be sufficiently bound with each other by the binder resin, the obtained coating film tends to become brittle.

In the magnetic recording medium according to the present invention, the amount of carbon black fine particles added to the magnetic recording layer thereof can be reduced to usually less than 6 parts by weight, preferably less than 5 parts by weight, more preferably less than 3 parts by weight based on 100 parts by weight of the black plate-shaped ferrite composite particles with magnetoplumbite structure.

Further, in the case where the black plate-shaped ferrite composite particles with magnetoplumbite structure wherein the particle size thereof is large and a large amount of the carbon black coat can be formed onto the surface thereof, especially in an amount of 7 to 10 parts by weight based on 100 parts by weight of the plate-shaped ferrite particles with magnetoplumbite structure, are used as magnetic particles, it can be expected to omit the addition of the carbon black fine particles to the magnetic recording layer.

Incidentally, the magnetic recording layer may optionally contain a lubricant, an abrasive, an anti-static agent and other additives which are usually used for the production of magnetic recording media, in an amount of 0.1 to 50 parts by weight based on 100 parts of the binder resin.

In the magnetic recording medium according to the present invention, at least one non-magnetic undercoat layer comprising a binder resin and non-magnetic particles such as hematite particles or the like may be sandwiched between the non-magnetic base film and the magnetic coating film. As the binder resin used therein, resins which are at present generally used for the production of a magnetic recording medium may be used. The mixing ratio of the non-magnetic particles with the binder resin is usually 5 to 2000 parts by weight, preferably 100 to 1000 parts by weight based on 100 parts by weight of the binder resin. The thickness of the non-magnetic undercoat layer obtained by applying a non-magnetic coating composition comprising the binder resin, an solvent and the non-magnetic particles, on the surface of the non-magnetic base film and drying, is usually 0.2 to 10.0 μm, preferably 0.5 to 5.0 μm. Further, it is possible to add a lubricant, a polishing agent, an antistatic agent, etc. which are generally used for the production of a magnetic recording medium to the non-magnetic undercoat layer.

The magnetic recording medium having the non-magnetic undercoat layer according to the present invention, can be more improved in a light transmittance, a smooth surface and a strength of the coating film.

The magnetic recording medium according to the present invention has a coercive force of usually 500 to 4,000 Oe; a squareness (residual magnetic flux density Br/saturation magnetic flux density Bm) of usually 0.82 to 0.95; a gloss (of the coating film) of usually 165 to 300%; a linear adsorption coefficient (of the coating film) of usually 1.20 to 10.0 μm$^{-1}$; a surface roughness Ra (of the coating film) of usually not more than 12.0 nm; a surface resistivity of not more than $1.0 \times 10^{10}$ Ω/sq; and a Young's modulus (relative value to a commercially available video tape: AV T-120 produced by Victor Company of Japan, Limited) of usually 124 to 160.

In case of using the black plate-shaped ferrite composite particles with magnetoplumbite structure as magnetic particles, wherein the plate-shaped ferrite particles with magnetoplumbite structure which are uncoated with the hydroxides and/or oxides of aluminum and/or silicon, are used as core particles, the magnetic recording medium according to the present invention has a coercive force of usually 500 to 4,000 Oe, preferably 650 to 4,000 Oe; a squareness (residual magnetic flux density Br/saturation magnetic flux density Bm) of usually 0.82 to 0.95, preferably 0.83 to 0.95; a gloss (of the coating film) of usually 165 to 300%, preferably 170 to 300%; a linear adsorption coefficient (of the coating film) of usually 1.20 to 10.0 $\mu m^{-1}$, preferably 1.25 to 10.0 $\mu m^{-1}$; a surface roughness Ra (of the coating film) of usually not more than 12.0 nm, preferably 2.0 to 11.0 nm, more preferably 2.0 to 10.0 nm; a surface resistivity of usually not more than $1 \times 10^{10}$ Ω/sq, preferably not more than $7.5 \times 10^9$ Ω/sq, more preferably not more than $5.0 \times 10^9$ Ω/sq; and a Young's modulus (relative value to a commercially available video tape: AV T-120 produced by Victor Company of Japan, Limited) of usually 124 to 160, preferably 125 to 160.

In case of using the black plate-shaped ferrite composite particles with magnetoplumbite structure as magnetic particles, wherein the plate-shaped ferrite particles with magnetoplumbite structure which are coated with the hydroxides and/or oxides of aluminum and/or silicon are used as core particles, the magnetic recording medium according to the present invention has a coercive force of usually 500 to 4,000 Oe, preferably 650 to 4,000 Oe; a squareness (residual magnetic flux density Br/saturation magnetic flux density Bm) of usually 0.82 to 0.95, preferably 0.83 to 0.95; a gloss (of the coating film) of usually 170 to 300%, preferably 175 to 300%; a linear adsorption coefficient (of the coating film) of usually 1.20 to 10.0 $\mu m^{-1}$, preferably 1.25 to 10.0 $\mu m^{-1}$; a surface roughness Ra (of the coating film) of usually not more than 11.5 nm, preferably 2.0 to 10.5 nm, more preferably 2.0 to 9.5 nm, a surface resistivity of usually not more than $1.0 \times 10^{10}$ Ω/sq, preferably not more than $7.5 \times 10^9$ Ω/sq, more preferably not more than $5.0 \times 10^9$ Ω/sq; and a Young's modulus (relative value to a commercially available video tape: AV T-120 produced by Victor Company of Japan, Limited) of usually 125 to 160, preferably 126 to 160.

The black plate-shaped ferrite composite particles with magnetoplumbite structure according to the present invention can be produced by the following method.

The coating of the plate-shaped ferrite particles with magnetoplumbite structure with the alkoxysilane compounds, the polysiloxanes, the modified polysiloxanes, the terminal-modified polysiloxanes or the fluoroalkylsilane compounds, may be conducted (i) by mechanically mixing and stirring the plate-shaped ferrite particles with magnetoplumbite structure together with the alkoxysilane compounds, the polysiloxanes, the modified polysiloxanes, the terminal-modified polysiloxanes or the fluoroalkylsilane compounds; or (ii) by mechanically mixing and stirring both the components together while spraying the alkoxysilane compounds, the polysiloxanes, the modified polysiloxanes, the terminal-modified polysiloxanes or the fluoroalkylsilane compounds onto the plate-shaped ferrite particles with magnetoplumbite structure. In these cases, substantially whole amount of the alkoxysilane compounds, the polysiloxanes, the modified polysiloxanes, the terminal-modified polysiloxanes or the fluoroalkylsilane compounds added can be coated onto the surfaces of the plate-shaped ferrite particles with magnetoplumbite structure.

In order to uniformly coat the surfaces of the plate-shaped ferrite particles with magnetoplumbite structure as core particles with the alkoxysilane compounds, the polysiloxanes, the modified polysiloxanes, the terminal-modified polysiloxanes or the fluoroalkylsilane compounds, it is preferred that the plate-shaped ferrite particles with magnetoplumbite structure are preliminarily diaggregated by using a pulverizer.

As apparatus (a) for mixing and stirring the core particles with the alkoxysilane compounds, the polysiloxanes, the modified polysiloxanes, the terminal-modified polysiloxanes or the fluoroalkylsilane compounds to form the coating layer thereof, and (b) for mixing and stirring carbon black fine particles with the particles whose surfaces are coated with the alkoxysilane compounds, the polysiloxanes, the modified polysiloxanes, the terminal-modified polysiloxanes or the fluoroalkylsilane compounds to form the carbon black coat, there may be preferably used those apparatus capable of applying a shear force to the particles, more preferably those apparatuses capable of conducting the application of shear force, spaturate force and compressed force at the same time. In addition, by conducting the above mixing or stirring treatment (a) of the core particles together with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the core particles may be changed to the organosilane compounds and fluoroalkyl organosilane compounds, respectively.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, the terminal-modified polysiloxanes or the fluoroalkylsilane compounds as uniformly as possible, the conditions of the above mixing or stirring treatment may be appropriately controlled such that the linear load is usually 2 to 200 Kg/cm, preferably 10 to 150 Kg/cm, more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, the terminal-modified polysiloxanes or the fluoroalkylsilane compounds added, is preferably 0.15 to 45 parts by weight based on 100 parts by weight of the plate-shaped ferrite particles with magnetoplumbite structure. When the amount of the alkoxysilane compounds, the polysiloxanes, the modified polysiloxanes, the terminal-modified polysiloxanes or the fluoroalkylsilane compounds added is less than 0.15 part by weight, it may become difficult to form the carbon black coat in such an amount enough to improve the blackness and volume resistivity of the obtained black plate-shaped ferrite composite particles with magnetoplumbite structure.

On the other hand, when the amount of the alkoxysilane compounds, the polysiloxanes, the modified polysiloxanes, the terminal-modified polysiloxanes or the fluoroalkylsilane compounds added is more than 45 parts by weight, a sufficient amount of the carbon black coat can be formed on the surface of the coating, but it is meaningless because the blackness and volume resistivity of the obtained black plate-shaped ferrite composite particles with magnetoplumbite structure cannot be further improved by using such an excess amount of the alkoxysilane compounds, the polysiloxanes, the modified polysiloxanes, the terminal-modified polysiloxanes or the fluoroalkylsilane compounds added.

Next, the carbon black fine particles are added to the plate-shaped ferrite particles with magnetoplumbite structure coated with the alkoxysilane compounds, the polysiloxanes, the modified polysiloxanes, the terminal-modified polysiloxanes or the fluoroalkylsilane compounds, and the resultant mixture is mixed and stirred to form the carbon black coat on the surfaces of the coating composed of the alkoxysilane compounds, the polysiloxanes, the modified polysiloxanes, the terminal-modified polysiloxanes or the fluoroalkylsilane compounds added. In addition, by conducting the above mixing or stirring treatment (b) of the carbon black fine particles together with the plate-shaped ferrite particles with magnetoplumbite structure coated with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the plate-shaped ferrite particles with magnetoplumbite structure as the core particles may be changed to the organosilane compounds and fluoroalkyl organosilane compounds, respectively.

In the case where the alkoxysilane compounds and the fluoroalkylsilane compounds are used as the coating compound, after the carbon black coat is formed on the surface of the coating layer, the resultant composite particles may be dried or heat-treated, for example, at a temperature of usually 40 to 200° C., preferably 60 to 150° C. for usually 10 minutes to 12 hours, preferably 30 minutes to 3 hours.

It is preferred that the carbon black fine particles are added little by little and slowly, especially about 5 to 60 minutes.

In order to form carbon black coat onto the coating layer composed of the alkoxysilane compounds, the polysiloxanes, the modified polysiloxanes, the terminal-modified polysiloxanes or the fluoroalkylsilane compounds as uniformly as possible, the conditions of the above mixing or stirring treatment can be appropriately controlled such that the linear load is usually 2 to 200 Kg/cm, preferably 10 to 150 Kg/cm more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the carbon black fine particles added is preferably 0.5 to 10 parts by weight based on 100 parts by weight of the plate-shaped ferrite particles with magnetoplumbite structure. When the amount of the carbon black fine particles added is less than 0.5 part by weight, it may become difficult to form the carbon black coat in such an amount enough to improve the blackness and volume resistivity of the obtained black plate-shaped ferrite composite particles with magnetoplumbite structure. On the other hand, when the amount of the carbon black fine particles added is more than 10 parts by weight, a sufficient blackness and volume resistivity of the resultant black plate-shaped ferrite composite particles with magnetoplumbite structure can be obtained, but the carbon black tend to be desorbed from the surface of the coating layer because of too large amount of the carbon black, resulting in deteriorated dispersibility in the vehicle upon the production of the magnetic coating composition.

The plate-shaped ferrite particles with magnetoplumbite structure may be coated with at least one compound selected from the group consisting of hydroxides of aluminum, oxides of aluminum, hydroxides of silicon and oxides of silicon, if required, prior to mixing and stirring with the alkoxysilane compounds, the polysiloxanes, the modified polysiloxanes, the terminal-modified polysiloxanes or the fluoroalkylsilane compounds.

The coating of the hydroxides and/or oxides of aluminum and/or silicon may be conducted by adding an aluminum compound, a silicon compound or both the compounds to a water suspension in which the plate-shaped ferrite particles with magnetoplumbite structure are dispersed, followed by mixing and stirring, and further adjusting the pH value of the suspension, if required, thereby coating the surfaces of the plate-shaped ferrite particles with magnetoplumbite structure with at least one compound selected from the group consisting of hydroxides of aluminum, oxides of aluminum, hydroxides of silicon and oxides of silicon. The thus obtained plate-shaped ferrite particles with magnetoplumbite structure coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the plate-shaped ferrite particles with magnetoplumbite structure. When the amount of the aluminum compound added is less than 0.01% by weight, it may be difficult to sufficiently coat the surfaces of the plate-shaped ferrite particles with magnetoplumbite structure with hydroxides and/or oxides of aluminum, thereby failing to achieve the improvement of the dispersibility in the vehicle upon the production of the magnetic coating composition. On the other hand, when the amount of the aluminum compound added is more than 20% by weight, the coating effect is saturated and, therefore, it is meaningless to add such an excess amount of the aluminum compound.

As the silicon compounds, there may be exemplified #3 water glass, sodium orthosilicate, sodium metasilicate or the like.

The amount of the silicon compound added is 0.01 to 20% by weight (calculated as $SiO_2$) based on the weight of the plate-shaped ferrite particles with magnetoplumbite structure. When the amount of the silicon compound added is less than 0.01% by weight, it may be difficult to sufficiently coat the surfaces of the plate-shaped ferrite particles with magnetoplumbite structure with hydroxides and/or oxides of silicon, thereby failing to achieve the improvement of the dispersibility in the vehicle upon the production of the magnetic coating composition. On the other hand, when the amount of the silicon compound added is more than 20% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the plate-shaped ferrite particles with magnetoplumbite structure.

The process of the magnetic recording medium according to the present invention is described as follows.

The magnetic recording medium according to the present invention can be produced by applying a magnetic coating composition containing the black plate-shaped ferrite composite particles with magnetoplumbite structure, a binder resin and a solvent, on the non-magnetic substrate, followed by drying, to form a magnetic recording layer thereon.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the black plate-shaped ferrite composite particles with magnetoplumbite structure. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

An point of the present invention lies in that the black plate-shaped ferrite composite particles with magnetoplumbite structure having an average particle size of 0.01 to 0.2 μm, comprising as core particles the plate-shaped ferrite particles with magnetoplumbite structure which may be coated with at least one compound selected from the group consisting of hydroxides of aluminum, oxides of aluminum, hydroxides of silicon and oxides of silicon; the organosilicon compounds coated on the surface of the plate-shaped ferrite particles with magnetoplumbite structure; and the carbon black coat formed on the surface of the coating layer comprising the organosilicon compounds, in an amount of 0.5 to 10 parts by weight based on 100 parts by weight of the plate-shaped ferrite particles with magnetoplumbite structure, can show excellent in dispersibility in vehicle due to less amount of carbon black fallen-off from the surface of each black plate-shaped ferrite particles with magnetoplumbite structure, and have a high blackness and a low volume resistivity.

The reason why the black plate-shaped ferrite composite particles with magnetoplumbite structure according to the present invention can show an excellent blackness, is considered such that since the carbon black coat is uniformly and densely formed on the surfaces of the plate-shaped ferrite particles with magnetoplumbite structure, the color tone of the core particles is hidden behind the carbon black, so that an inherent color tone of carbon black can be exhibited.

The reason why the black plate-shaped ferrite composite particles with magnetoplumbite structure according to the present invention can show a low volume resistivity is considered as follows. That is, the carbon black coat having an excellent conductivity can be uniformly and densely formed onto the surface of each black plate-shaped ferrite composite particles with magnetoplumbite structure.

The reason why the amount of the carbon black desorbed or fallen-off from the surfaces of the black plate-shaped ferrite composite particles with magnetoplumbite structure according to the present invention, is small, is considered as follows.

In the case of using as organosilane compounds, the alkoxysilane compounds and the fluoroalkylsilane compounds, metalloxane bonds ($\equiv$Si—O—M wherein M represents a metal atom contained in the plate-shaped ferrite particles with magnetoplumbite structure, such as Si, Al, Fe or the like) are formed between the surfaces of the plate-shaped ferrite particles with magnetoplumbite structure and alkoxy groups contained in the organosilicon compounds onto which the carbon black coat is formed, thereby forming a stronger bond between the organosilicon compounds on which the carbon black coat is formed, and the surfaces of the plate-shaped ferrite particles with magnetoplumbite structure.

In the case of using as organosilane compounds, polysiloxanes or modified polysiloxanes, functional groups contained in the polysiloxanes or modified polysiloxanes onto which the carbon black coat is formed, thereby forming a stronger bond between the polysiloxanes or modified polysiloxanes on which the carbon black coat is formed, and the surfaces of the plate-shaped ferrite particles with magnetoplumbite structure.

The reason why the black plate-shaped ferrite composite particles with magnetoplumbite structure according to the present invention can exhibit an excellent dispersibility in vehicles upon the production of magnetic coating compositions, is considered as follows. That is, due to the fact that a less amount of carbon black are desorbed or fallen-off from the surfaces of the black plate-shaped ferrite composite particles with magnetoplumbite structure, the black plate-shaped ferrite composite particles with magnetoplumbite structure are free from the deterioration in dispersibility due to the desorbed or fallen-off carbon black.

In addition, the black plate-shaped ferrite composite particles with magnetoplumbite structure which tend to be stacked together can be prevented from being contacted with each other. Further, since the carbon black coat is non-magnetic, the black plate-shaped ferrite composite particles with magnetoplumbite structure can be prevented from being magnetically aggregated together.

The magnetic recording medium according to the present invention which is obtained by using the above-mentioned black plate-shaped ferrite composite particles with magnetoplumbite structure as magnetic particles, can show a low light transmittance and a low surface resistivity even when the amount of carbon black fine particles added to the magnetic recording layer is as small as possible, and the magnetic recording layer thereof can exhibit an improved surface smoothness.

The reason why the magnetic recording medium can show a low light transmittance even when the amount of carbon black fine particles added to the magnetic recording layer is small, is considered as follows. That is, in the case of the black plate-shaped ferrite composite particles with magnetoplumbite structure according to the present invention, the carbon black can be uniformly and densely coated onto the surface of each plate-shaped ferrite particle with magnetoplumbite structure and, therefore, can be dispersed in the coating film in such a condition close to primary particles, whereby the carbon black can effectively exhibit their own functions.

The reason why the surface resistivity of the magnetic recording medium can be kept low even when the amount of carbon black fine particles added to the magnetic recording layer is small, is considered as follows. That is, due to the fact that the black plate-shaped ferrite composite particles with magnetoplumbite structure are uniformly dispersed in the coating film, the carbon black coat uniformly and densely formed onto the surfaces thereof are continuously contacted with each other.

The reason why the magnetic recording medium according to the present invention can show an excellent surface smoothness, is considered as follows. That is, in the present invention, since the amount of the carbon black fine particles added to the magnetic recording layer is reduced to as small a level as possible, the black plate-shaped ferrite composite particles with magnetoplumbite structure can maintain a good dispersibility in vehicle upon production of the magnetic coating composition without being adversely affected by the carbon black fine particles added. Further, on the above-mentioned reason, the black plate-shaped ferrite composite particles with magnetoplumbite structure themselves can exhibit an excellent dispersibility.

The black plate-shaped ferrite composite particles with magnetoplumbite structure according to the present invention can exhibit a high blackness and a low volume resistivity value without containing $Fe^{2+}$ thereinto, and are excellent in dispersibility in vehicles. Therefore, in the case where the black plate-shaped ferrite composite particles with magnetoplumbite structure according to the present invention are used as magnetic particles, it becomes possible to produce a magnetic recording medium which has a low light transmittance and a low surface resistivity value even when the amount of carbon black fine particles added to the magnetic recording layer thereof is reduced to a level as small as possible, and which can show an excellent surface smoothness. Accordingly, the black plate-shaped ferrite composite particles with magnetoplumbite structure according to the present invention are useful as magnetic particles for high-density magnetic recording media.

As described above, due to the fact that the black plate-shaped ferrite composite particles with magnetoplumbite structure show an excellent blackness and a low volume resistivity, the magnetic recording medium according to the present invention can exhibit a low light transmittance and a low surface resistivity. Further, since the amount of carbon black fine particles added to the magnetic recording layer is reduced to as small a level as possible and the dispersibility of the black plate-shaped ferrite composite particles with magnetoplumbite structure is enhanced, the magnetic recording medium can have a smooth surface. Therefore, the magnetic recording medium according to the present invention can be suitably used as those for high-density recording.

Meanwhile, in the magnetic recording medium according to the present invention, by using the black plate-shaped ferrite composite particles with magnetoplumbite structure as magnetic particles, the amount of carbon black fine particles added to the magnetic recording layer, which have an average particle size as fine as about 0.002 to about 0.05 $\mu$m, a large BET specific surface area and a poor solvent-wettability, and are therefore, deteriorated in dispersibility in vehicles, can be reduced to as small a level as possible. Accordingly, the magnetic recording medium according to the present invention is advantageous from industrial and economical viewpoints, and is favorable from the standpoints of safety and hygiene.

EXAMPLES

The present invention is described in more detail by Examples and Comparative Examples, but the Examples are only illustrative and, therefore, not intended to limit the scope of the present invention.

Various properties were evaluated by the following methods.

(1) The average particle diameter and average thickness of plate-shaped ferrite particles with magnetoplumbite structure and black plate-shaped ferrite composite particles with magnetoplumbite structure, and average particle diameter of carbon black fine particles were respectively expressed by the average of values (measured in a predetermined direction) of about 350 particles which were sampled from a micrograph obtained by magnifying an original electron micrograph (×30,000) by four times in each of the longitudinal and transverse directions.

(2) The plate ratio of the particles was expressed by the ratio of average particle diameter to average thickness thereof.

(3) The geometrical standard deviation of particle diameter was expressed by values obtained by the following method. That is, the particle diameters were measured from the above-magnified electron micrograph. The actual particle diameters and the number of the particles were calculated from the measured values. On a logarithmic normal probability paper, the particle diameters were plotted at regular intervals on the abscissa-axis and the accumulative number (under integration sieve) of particles belonging to each interval of the particle diameters were plotted by percentage on the ordinate-axis by a statistical technique.

The particle diameters corresponding to the number of particles of 50% and 84.13%, respectively, were read from the graph, and the geometrical standard deviation was calculated from the following formula:

Geometrical standard deviation={particle diameters corresponding to 84.13% under integration sieve}/{particle diameters (geometrical average diameter) corresponding to 50% under integration sieve}

The closer to 1 the geometrical standard deviation value, the more excellent the particle size distribution.

(4) The specific surface area was expressed by the value measured by a BET method.

(5) The amounts of Al, Si, Ti and Ni which were present within plate-shaped ferrite particles with magnetoplumbite structure or black plate-shaped ferrite composite particles with magnetoplumbite structure or on surfaces thereof, and the amount of Si contained in the organosilicon compounds, were measured by a fluorescent X-ray spectroscopy device 3063 (manufactured by Rigaku Denki Kogyo Co., Ltd.) according to JIS K0119 "General rule of fluorescent X-ray analysis".

(6) The amount of carbon black coat formed on the plate-shaped ferrite particles with magnetoplumbite structure was measured by "Carbon/Sulfur Analyzer EMIA-2200 Model" (manufactured by Horiba Seisakusho Co., Ltd.).

(7) The thickness of carbon black coat formed on the surfaces of the plate-shaped ferrite particles with magnetoplumbite structure is expressed by the value which was obtained by first measuring an average thickness of carbon black coat formed onto the surfaces of the plate-shaped ferrite particles with magnetoplumbite structure on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(8) The desorption percentage of carbon black coat from the black plate-shaped ferrite composite particles with magnetoplumbite structure was measured by the following method. The closer to zero the desorption percentage, the smaller the amount of carbon black desorbed from the surfaces of black plate-shaped ferrite composite particles with magnetoplumbite structure.

That is, 3 g of the black plate-shaped ferrite composite particles with magnetoplumbite structure and 40 ml of ethanol were placed in a 50-ml precipitation pipe and then was subjected to ultrasonic dispersion for 20 minutes. Thereafter, the obtained dispersion was allowed to stand for 120 minutes, and the carbon black desorbed were separated from the black plate-shaped ferrite composite particles with magnetoplumbite structure on the basis of the difference in specific gravity between both the composite particles and carbon black. Next, the black plate-shaped ferrite composite particles with magnetoplumbite structure from which the desorbed carbon black was separated, were mixed again with 40 ml of ethanol, and the obtained mixture was further subjected to ultrasonic dispersion for 20 minutes. Thereafter, the obtained dispersion was allowed to stand for 120 minutes, thereby separating the black plate-shaped ferrite composite particles with magnetoplumbite structure and the carbon black desorbed from each other. The thus obtained black plate-shaped ferrite composite particles with magnetoplumbite structure were dried at 100° C. for one hour, and then the carbon content thereof was measured by the "Carbon/Sulfur Analyzer EMIA-2200 Model" (manufactured by Horiba Seisakusho Co., Ltd.). The desorption percentage of the carbon black was calculated according to the following formula:

Desorption percentage of carbon black=$\{(W_a-W_e)/W_a\} \times 100$ wherein $W_a$ represents an amount of carbon black initially coat from the black plate-shaped ferrite composite particles with magnetoplumbite structure; and $W_e$ represents an amount of carbon black still coat from the black plate-shaped ferrite composite particles with magnetoplumbite structure after desorption test.

(9) The ratio of $Fe^{2+}$ to $Fe^{3+}$ ($Fe^{2+}/Fe^{3+}$ ratio) in the black plate-shaped ferrite composite particles with magnetoplumbite structure, is expressed by the value measured as follows.

First, sample particles were titrated using a potassium bichromate standard solution according to JIS M-8212 "Method of determining a total quantity of iron in iron ores" in order to determine a total amount of iron (total amount of $Fe^{2+}$ and $Fe^{3+}$) in the sample particles.

The amount of $Fe^{2+}$ was determined as follows. That is, 0.5 g of the sample particles were accurately weighed and charged into a 500 ml-conical flask. While air in the flask was replaced with nitrogen, 50 ml of a mixed acid was added to the flask using a measuring cylinder, and the content of the flask was heated to dissolve the sample particles in the mixed acid. Thereafter, the resultant solution was mixed with 200 ml of water and then with 2 or 3 droplets of a sodium diphenylamine-sulfonate solution, and then titrated using a 1N—$K_2Cr_2O_7$ standard solution, thereby determining the amount of $Fe^{2+}$ in the sample particles.

The amount of $Fe^{3+}$ in the sample particles was obtained by subtracting the amount of $Fe^{2+}$ from the total amount of iron therein.

(10) The blackness of plate-shaped ferrite particles with magnetoplumbite structure and black plate-shaped ferrite composite particles with magnetoplumbite structure was measured by the following method. That is, 0.5 g of sample particles and 1.5 cc of castor oil were intimately kneaded together by a Hoover's muller to form a paste. 4.5 g of clear lacquer was added to the obtained paste and was intimately kneaded to form a paint. The obtained paint was applied on a cast-coated paper by using a 6-mil applicator to produce a coating film piece (having a film thickness of about 30 μm). The thus obtained coating film piece was measured according to JIS Z 8729 by a multi-light source spectrographic calorimeter MSC-IS-2D (manufactured by Suga Testing Machines Manufacturing Co., Ltd.) to determine an L*value of calorimetric indices thereof. The blackness was expressed by the L*value measured.

Here, the L*value represents a lightness, and the smaller the L*value, the more excellent the blackness.

(11) The volume resistivity of the plate-shaped ferrite particles with magnetoplumbite structure and the black plate-shaped ferrite composite particles with magnetoplumbite structure was measured by the following method.

That is, first, 0.5 g of a sample particles to be measured was weighted, and press-molded at 140 Kg/cm$^2$ using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was applied between the electrodes using a Wheatstone bridge (model 4329A, manufactured by Yokogawa-Hokushin Denki Co., Ltd.) to measure a resistance value R (Ω).

The cylindrical test piece was measured with respect to an upper surface area A (cm$^2$) and a thickness $t_0$ (cm) thereof. The measured values were inserted into the following formula, thereby obtaining a volume resistivity X (Ω·cm).

$X(\Omega \cdot cm) = R \times (A/t_0)$

(12) The magnetic properties of the plate-shaped ferrite particles with magnetoplumbite structure, black plate-shaped ferrite composite particles with magnetoplumbite structure and magnetic recording medium were measured under an external magnetic field of 10 kOe by "Vibration Sample Magnetometer VSM-3S-15 (manufactured by Toei Kogyo, Co., Ltd.)".

(13) The percentage of change in coercive force value with the passage of time of the black plate-shaped ferrite composite particles with magnetoplumbite structure is determined as follows.

That is, sample particles to be tested were allowed to stand at a temperature of 60° C. and a relative humidity of 90% for one week. The coercive force value of the sample particles after the above test is divided by that before the test, thereby obtaining a percentage of change in coercive force value with the passage of time of the sample particles.

(14) The light transmittance is expressed by the linear adsorption coefficient calculated by substituting the light transmittance measured by using "UV-Vis Recording Spectrophotometer UV-2100" (manufactured by Shimazu Seisakusho, Ltd.) for the following formula. The larger the value, the more difficult it is for the magnetic recording medium to transmit light:

Linear adsorption coefficient ($\mu m^{-1}$)=$\{\ln(1/t)\}/FT$ wherein t represents a light transmittance (–) at λ=900 nm, and FT represents thickness (μm) of the magnetic recording layer used for the measurement.

(15) The surface resistivity of the magnetic recording layer of the magnetic recording medium was measured by the following method.

That is, the coating film to be measured was exposed to the environment maintained at 25° C. and a relative humidity of 60%, for not less than 12 hours. Thereafter, the coating film was slit into 6 mm width, and the slit coating film was placed on two metal electrodes having a width of 6.5 mm such that a coating surface thereof was contacted with the electrodes. 170-gram weights were respectively suspended at opposite ends of the coating film so as to bring the coating film into close contact with the electrodes. D.C. 500 V was applied between the electrodes, thereby measuring the surface resistivity of the coating film.

(16) The gloss of the surface of the magnetic recording layer was measured at an angle of incidence of 45° by "glossmeter UGV-5D" (manufactured by Suga Shikenki, Co., Ltd.).

(17) The surface roughness Ra is expressed by the average value of the center-line average roughness of the profile curve of the surface of the magnetic recording layer by using "Surfcom-575A" (manufactured by Tokyo Seimitsu Co., Ltd.).

(18) The strength of the magnetic recording layer and non-magnetic undercoat layer was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(19) The viscosity of the coating composition was obtained by measuring the viscosity of the coating composition at 25° C. at a shear rate D of 1.92 $sec^{-1}$ by using "E type viscometer EMD-R" (manufactured by Tokyo Keiki, Co., Ltd.).

(20) The thickness of each of the non-magnetic base film, the non-magnetic undercoat layer and the magnetic coating film constituting the magnetic recording medium was measured in the following manner by using "Digital Electronic Micrometer R351C" (manufactured by Anritsu Corp.)

The thickness (A) of a non-magnetic base film was first measured. Similarly, the thickness (B) (B=the sum of the thicknesses of the non-magnetic base film and the non-magnetic undercoat layer) of a non-magnetic substrate obtained by forming a non-magnetic undercoat layer on the base film was measured. Furthermore, the thickness (C) (C=the sum of the thicknesses of the non-magnetic base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1
<Production of Black Plate-shaped Ferrite Composite Particles with Magnetoplumbite Structure>

20 kg of plate-shaped ferrite particles with magnetoplumbite structure (Ti/Fe=2.0 mol %; Ni/Fe=4.0 mol %; average particle diameter: 0.033 $\mu$m; average thickness: 0.01 $\mu$m; plate ratio: 3.3:1; geometrical standard deviation value: 1.38; BET specific surface area value: 56.1 $m^2$/g; blackness (L*value): 31.5; volume resistivity: $8.8 \times 10^8$ $\Omega \cdot cm$; coercive force value: 2,060 Oe; saturation magnetization value: 51.5 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the plate-shaped ferrite particles with magnetoplumbite structure.

Successively, the obtained slurry containing the plate-shaped ferrite particles with magnetoplumbite structure was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the plate-shaped ferrite particles with magnetoplumbite structure were dispersed.

The particles in the obtained slurry which remained on a sieve of 325 meshes (mesh size: 44 $\mu$m) was 0%. The slurry was filtered and washed with water, thereby obtaining a filter cake containing the plate-shaped ferrite particles with magnetoplumbite structure. After the obtained filter cake containing the plate-shaped ferrite particles with magnetoplumbite structure was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 15 minutes, thereby lightly deagglomerating the particles.

220 g of methyl triethoxysilane (tradename: "TSL8123", produced by TOSHIBA SILICONE CO., LTD.) was mixed and diluted with 200 ml of ethanol to obtain a methyl triethoxysilane solution. The methyl triethoxysilane solution was added to the deagglomerated plate-shaped ferrite particles with magnetoplumbite structure under the operation of the edge runner. The plate-shaped ferrite particles with magnetoplumbite structure were continuously mixed and stirred at a linear load of 30 Kg/cm and a stirring speed of 22 rpm for 20 minutes.

Next, 550 g of carbon black fine particles (particle shape: granular shape; average particle size: 0.022 $\mu$m; geometrical standard deviation value: 1.68; BET specific surface area value: 134 $m^2$/g; and blackness (L*value): 16.6) were added to the plate-shaped ferrite particles with magnetoplumbite structure coated with methyl triethoxysilane for 10 minutes while operating the edge runner. Further, the mixed particles were continuously stirred at a linear load of 30 Kg/cm and a stirring speed of 22 rpm for 30 minutes to form the carbon black coat on the coating layer composed of methyl triethoxysilane, thereby obtaining black plate-shaped ferrite composite particles with magnetoplumbite structure.

The obtained black plate-shaped ferrite composite particles with magnetoplumbite structure were heat-treated at 80° C. for 120 minutes by using a drier. The resultant black plate-shaped ferrite composite particles with magnetoplumbite structure had an average particle diameter of 0.035 $\mu$m, an average thickness of 0.011 $\mu$m, a plate ratio of 3.2:1. In addition, the black plate-shaped ferrite composite particles with magnetoplumbite structure showed a geometrical standard deviation value of 1.38, a BET specific surface area value of 58.6 $m^2$/g, a blackness (L*value) of 22.8 and a volume resistivity of $4.5 \times 10^6$ $\Omega \cdot cm$. The desorption percentage of the carbon black from the black plate-shaped ferrite composite particles with magnetoplumbite structure was 3.5%. As to the magnetic properties, the coercive force value of the black plate-shaped ferrite composite particles with magnetoplumbite structure was 2,072 Oe and the saturation magnetization value was 48.7 emu/g. The ratio of $Fe^{2+}$ to $Fe^{3+}$ ($Fe^{2+}/Fe^{3+}$) in the black plate-shaped ferrite composite particles with magnetoplumbite structure was 0.0. The percentage of change in coercive force value with the passage of time of the black plate-shaped ferrite composite particles with magnetoplumbite structure was 0.0%. The coating amount of an organosilane compound produced from methyl triethoxysilane was 0.30% by weight (calculated as Si) based on the weight of the black plate-shaped ferrite composite particles with magnetoplumbite structure (corresponding to 2 parts by weight based on 100 parts by weight of plate-shaped ferrite particles with magnetoplumbite structure). The amount of the carbon black coat formed to the coating layer composed of the organosilane compound produced from methyl triethoxysilane on the plate-shaped ferrite particles with magnetoplumbite structure is 4.71% by weight (calculated as C) based on the weight of the black plate-shaped ferrite composite particles with magnetoplumbite structure (corresponding to 5 parts by weight based on 100 parts by weight of the plate-shaped ferrite particles with magnetoplumbite structure). The thickness of the carbon black coat formed was 0.0022 μm. Since no independent carbon black was observed on the electron micrograph, it was determined that a whole amount of the carbon black used contributed to the formation of the carbon black coat on the coating layer composed of the organosilane compound produced from methyl triethoxysilane.

Meanwhile, for comparison, the plate-shaped ferrite particles with magnetoplumbite structure uncoated with the organosilicon compound, and the carbon black fine particles were mixed and stirred together by an edge runner in the same manner as described above, thereby obtaining mixed particles. An electron micrograph, it was confirmed that the carbon black fine particles were not adhered on the surfaces of the plate-shaped ferrite particles with magnetoplumbite structure, and both the particles were present independently.

Example 2
<Production of Magnetic Recording Medium>

12 g of the black plate-shaped ferrite composite particles with magnetoplumbite structure obtained in Example 1, 1.2 g of a polishing agent (AKP-50: trade name, produced by Sumitomo Chemical Co., Ltd.), 0.06 g of carbon black fine particles (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Black plate-shaped ferrite composite particles with magnetoplumbite structure | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-50) | 10 parts by weight |
| Carbon black fine particles (#3250B) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 64.9 parts by weight |
| Methyl ethyl ketone | 162.2 parts by weight |
| Toluene | 97.3 parts by weight |

The viscosity of the obtained magnetic coating composition was 2,820 cP.

The magnetic coating composition obtained was applied to a polyethylene terephthalate film (thickness: 12 μm) as a non-magnetic base film to a thickness of 45 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 3.5 μm.

The coercive force value of the magnetic tape produced by forming a magnetic recording layer on the non-magnetic base film was 2,121 Oe, the squareness (Br/Bm) thereof was 0.88, the gloss thereof was 183%, the linear absorption coefficient thereof was 1.41 $\mu m^{-1}$, the surface resistivity was $7.0 \times 10^8$ Ω/sq, the surface roughness Ra thereof was 8.0 nm, and the Young's modulus (relative value) thereof was 135.

Example 3
<Production of Black Plate-shaped Ferrite Composite Particles with Magnetoplumbite structure>

20 kg of plate-shaped ferrite particles with magnetoplumbite structure (Ti/Fe=2.0 mol %; Ni/Fe=4.0 mol %; average particle diameter: 0.033 μm; average thickness: 0.01 μm; plate ratio: 3.3:1; geometrical standard deviation value: 1.38; BET specific surface area value: 56.1 $m^2/g$; blackness (L*value): 31.5; volume resistivity: $8.8 \times 10^8$ Ω·cm; coercive force value: 2,060 Oe; saturation magnetization value: 51.5 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the plate-shaped ferrite particles with magnetoplumbite structure.

Successively, the obtained slurry containing the plate-shaped ferrite particles with magnetoplumbite structure was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the plate-shaped ferrite particles with magnetoplumbite structure were dispersed.

The particles in the obtained slurry which remained on a sieve of 325 meshes (mesh size: 44 μm) was 0%. The slurry was filtered and washed with water, thereby obtaining a filter cake containing the plate-shaped ferrite particles with magnetoplumbite structure. After the obtained filter cake containing the plate-shaped ferrite particles with magnetoplumbite structure was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 15 minutes, thereby lightly deagglomerating the particles.

220 g of methyl hydrogen polysiloxane (tradename: "TSF484", produced by TOSHIBA SILICONE CO., LTD.) were added to the deagglomerated plate-shaped ferrite particles with magnetoplumbite structure under the operation of the edge runner. The plate-shaped ferrite particles with magnetoplumbite structure were continuously mixed and stirred at a linear load of 30 Kg/cm and a stirring speed of 22 rpm for 20 minutes.

Next, 550 g of carbon black fine particles (particle shape: granular shape; average particle size: 0.022 $\mu$m; geometrical standard deviation value: 1.68; BET specific surface area value: 134 m$^2$/g; and blackness (L*value): 16.6) were added to the plate-shaped ferrite particles with magnetoplumbite structure coated with methyl hydrogen polysiloxane for 10 minutes while operating the edge runner. Further, the mixed particles were continuously stirred at a linear load of 30 Kg/cm and a stirring speed of 22 rpm for 30 minutes to form the carbon black coat on the coating layer composed of methyl hydrogen polysiloxane, thereby obtaining black plate-shaped ferrite composite particles with magnetoplumbite structure.

The obtained black plate-shaped ferrite composite particles with magnetoplumbite structure were dried at 80° C. for 120 minutes by using a drier. The resultant black plate-shaped ferrite composite particles with magnetoplumbite structure had an average particle diameter of 0.035 $\mu$m, an average thickness of 0.011 $\mu$m, a plate ratio of 3.2:1. In addition, the black plate-shaped ferrite composite particles with magnetoplumbite structure showed a geometrical standard deviation value of 1.39, a BET specific surface area value of 59.1 m$^2$/g, a blackness (L*value) of 22.4 and a volume resistivity of 3.6×10$^6$ $\Omega$·cm. The desorption percentage of the carbon black from the black plate-shaped ferrite composite particles with magnetoplumbite structure was 2.6%. As to the magnetic properties, the coercive force value of the black plate-shaped ferrite composite particles with magnetoplumbite structure was 2,069 Oe and the saturation magnetization value was 49.1 emu/g. The ratio of Fe$^{2+}$ to Fe$^{3+}$ (Fe$^{2+}$/Fe$^{3+}$) in the black plate-shaped ferrite composite particles with magnetoplumbite structure was 0.0. The percentage of change in coercive force value with the passage of time of the black plate-shaped ferrite composite particles with magnetoplumbite structure was 0.0%. The amount of the coating layer composed of methyl hydrogen polysiloxane was 0.88% by weight (calculated as Si) based on the weight of the black plate-shaped ferrite composite particles with magnetoplumbite structure (corresponding to 2 parts by weight based on 100 parts by weight of the plate-shaped ferrite particles with magnetoplumbite structure). The amount of the carbon black coat formed to the coating layer composed of methyl hydrogen polysiloxane on the plate-shaped ferrite particles with magnetoplumbite structure is 4.69% by weight (calculated as C) based on the weight of the black plate-shaped ferrite composite particles with magnetoplumbite structure (corresponding to 5 parts by weight based on 100 parts by weight of the plate-shaped ferrite particles with magnetoplumbite structure). The thickness of the carbon black coat formed was 0.0022 $\mu$m. Since no carbon black was observed on the electron micrograph, it was determined that a whole amount of the carbon black used contributed to the formation of the carbon black coat on the coating layer composed of methyl hydrogen polysiloxane.

Example 4
<Production of Magnetic Recording Medium>

12 g of the black plate-shaped ferrite composite particles with magnetoplumbite structure obtained in Example 3, 1.2 g of a polishing agent (AKP-50: trade name, produced by Sumitomo Chemical Co., Ltd.), 0.06 g of carbon black fine particles (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was the same as Example 2.

The viscosity of the obtained magnetic coating composition was 2,915 cP.

The magnetic coating composition obtained was applied to a polyethylene terephthalate film (thickness: 12 $\mu$m) as a non-magnetic base film to a thickness of 45 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 3.5 $\mu$m.

The coercive force value of the magnetic tape produced by forming a magnetic recording layer on the non-magnetic base film was 2,086 Oe, the squareness (Br/Bm) thereof was 0.89, the gloss thereof was 186%, the linear absorption coefficient thereof was 1.44 $\mu$m$^{-1}$, and the surface resistivity was 5.2×10$^8$ $\Omega$/sq, the surface roughness Ra thereof was 7.2 nm, the Young's modulus (relative value) thereof was 135.

Example 5
<Production of Black Plate-shaped Ferrite Composite Particles with Magnetoplumbite Structure>

20 kg of plate-shaped ferrite particles with magnetoplumbite structure (Ti/Fe=2.0 mol %; Ni/Fe=4.0 mol %; average particle diameter: 0.033 $\mu$m; average thickness: 0.01 $\mu$m; plate ratio: 3.3:1; geometrical standard deviation value: 1.38; BET specific surface area value: 56.1 m$^2$/g; blackness (L*value): 31.5; volume resistivity: 8.8×10$^8$ $\Omega$·cm; coercive force value: 2,060 Oe; saturation magnetization value: 51.5 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the plate-shaped ferrite particles with magnetoplumbite structure.

Successively, the obtained slurry containing the plate-shaped ferrite particles with magnetoplumbite structure was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the plate-shaped ferrite particles with magnetoplumbite structure were dispersed.

The particles in the obtained slurry which remained on a sieve of 325 meshes (mesh size: 44$\mu$m) was 0%. The slurry was filtered and washed with water, thereby obtaining a filter cake containing the plate-shaped ferrite particles with magnetoplumbite structure. After the obtained filter cake containing the plate-shaped ferrite particles with magnetoplumbite structure was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 15 minutes, thereby lightly deagglomerating the particles.

220 g of tridecafluorooctyl trimethoxysilane (tradename "TSL8257", produced by TOSHIBA SILICONE CO., LTD.) were added to the deagglomerated plate-shaped ferrite particles with magnetoplumbite structure under the operation of the edge runner. The plate-shaped ferrite particles with magnetoplumbite structure were continuously mixed and stirred at a linear load of 30 Kg/cm and a stirring speed of 22 rpm for 20 minutes.

Next, 550 g of carbon black fine particles (particle shape: granular shape; average particle size: 0.022 $\mu$m; geometrical standard deviation value: 1.68; BET specific surface area value: 134 m$^2$/g; and blackness (L*value): 16.6) were added to the plate-shaped ferrite particles with magnetoplumbite structure coated with tridecafluorooctyl trimethoxysilane for 10 minutes while operating the edge runner. Further, the mixed particles were continuously stirred at a linear load of 30 Kg/cm and a stirring speed of 22 rpm for 30 minutes to form the carbon coat particles on the coating layer composed of tridecafluorooctyl trimethoxysilane, thereby obtaining black plate-shaped ferrite composite particles with magnetoplumbite structure.

The obtained black plate-shaped ferrite composite particles with magnetoplumbite structure were heat-treated at 80° C. for 120 minutes by using a drier. The resultant black plate-shaped ferrite composite particles with magnetoplumbite structure had an average particle diameter of 0.035 $\mu$m, an average thickness of 0.011 $\mu$m, a plate ratio of 3.2:1. In addition, the black plate-shaped ferrite composite particles with magnetoplumbite structure showed a geometrical standard deviation value of 1.38, a BET specific surface area value of 59.0 m$^2$/g, a blackness (L*value) of 22.6 and a volume resistivity of 3.8×10$^6$ $\Omega$·cm. The desorption percentage of the carbon black from the black plate-shaped ferrite composite particles with magnetoplumbite structure was 4.3%. As to the magnetic properties, the coercive force value of the black plate-shaped ferrite composite particles with magnetoplumbite structure was 2,066 Oe and the saturation magnetization value was 48.9 emu/g. The ratio of Fe$^{2+}$ to Fe$^{3+}$ (Fe$^{2+}$/Fe$^{3+}$) in the black plate-shaped ferrite composite particles with magnetoplumbite structure was 0.0. The percentage of change in coercive force value with the passage of time of the black plate-shaped ferrite composite particles with magnetoplumbite structure was 0.0%. The coating amount of a fluoroalkyl organosilane compound produced from tridecafluorooctyl trimethoxysilane was 0.11% by weight (calculated as Si) based on the weight of the black plate-shaped ferrite composite particles with magnetoplumbite structure (corresponding to 2 parts by weight based on 100 parts by weight of the plate-shaped ferrite particles with magnetoplumbite structure). The amount of the carbon black coat formed on the coating layer composed of the fluoroalkyl organosilane compound produced from tridecafluorooctyl trimethoxysilane on the plate-shaped ferrite particles with magnetoplumbite structure is 4.71% by weight (calculated as C) based on the weight of the black plate-shaped ferrite composite particles with magnetoplumbite structure (corresponding to 5 parts by weight based on 100 parts by weight of the plate-shaped ferrite particles with magnetoplumbite structure). The thickness of the carbon black coat formed was 0.0022 $\mu$m. Since no independent carbon black was observed on the electron micrograph, it was determined that a whole amount of the carbon black used contributed to the formation of the carbon black coat on the coating layer composed of the fluoroalkyl organosilane compound produced from tridecafluorooctyl trimethoxysilane.

Example 6

<Production of Magnetic Recording Medium>

12 g of the black plate-shaped ferrite composite particles with magnetoplumbite structure obtained in Example 5, 1.2 g of a polishing agent (AKP-50: trade name, produced by Sumitomo Chemical Co., Ltd.), 0.06 g of carbon black fine particles (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was the same as Example 2.

The viscosity of the obtained magnetic coating composition was 2,853 cP.

The magnetic coating composition obtained was applied to a polyethylene terephthalate film (thickness: 12 $\mu$m) as a non-magnetic base film to a thickness of 45 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 3.5 $\mu$m.

The coercive force value of the magnetic tape produced by forming a magnetic recording layer on the non-magnetic base film was 2,099 Oe, the squareness (Br/Bm) thereof was 0.89, the gloss thereof was 185%, the linear absorption coefficient thereof was 1.40 $\mu$m$^{-1}$, the surface resistivity was 9.6×10$^8$ $\Omega$/sq, the surface roughness Ra thereof was 7.8 nm, and the Young's modulus (relative value) thereof was 136.

Core Particles 1 to 2

Various plate-shaped ferrite particles with magnetoplumbite structure were prepared, and treated in the same manner as in Example 1 in order to obtain deaggregated plate-shaped ferrite particles with magnetoplumbite structure.

Various properties of the obtained plate-shaped ferrite particles with magnetoplumbite structure are shown in Table 1.

Core Particles 3

The same procedure as defined in Example 1 was conducted by using 20 kg of the deagglomerated plate-shaped ferrite particles with magnetoplumbite structure (core particles 1) and 150 liters of water, thereby obtaining a slurry containing the plate-shaped ferrite particles with magnetoplumbite structure. The pH value of the obtained re-dispersed slurry containing the plate-shaped ferrite particles with magnetoplumbite structure was adjusted to 10.5 by adding an aqueous sodium hydroxide solution, and then the concentration of the slurry was adjusted to 98 g/liter by adding water thereto. After 150 liters of the slurry was heated to 60° C., 5,444 ml of a 1.0 mol/liter sodium aluminate solution (equivalent to 1.0% by weight (calculated as Al) based on the weight of the plate-shaped ferrite particles with magnetoplumbite structure) was added to the slurry. After allowing the slurry to stand for 30 minutes, the pH value of the slurry was adjusted to 7.5 by adding an aqueous acetic acid solution. After further allowing the slurry to stand for 30 minutes, the slurry was subjected to filtration, washing with water, drying and pulverization, thereby obtaining the plate-shaped ferrite particles with magnetoplumbite structure coated with hydroxides of aluminum.

Main production conditions are shown in Table 2, and various properties of the obtained plate-shaped ferrite particles with magnetoplumbite structure are shown in Table 3.

Core Particles 4 to 5

The same procedure as defined above with respect to the core particles 3 was conducted except that kind of plate-shaped ferrite particles with magnetoplumbite structure, and kind and amount of surface-coating material used in the surface treatment step were varied, thereby obtaining surface-treated plate-shaped ferrite particles with magnetoplumbite structure.

Main production conditions are shown in Table 2, and various properties of the obtained surface-treated plate-shaped ferrite particles with magnetoplumbite structure are shown in Table 3.

Examples 7 to 11 and Comparative Examples 1 to 5

The same procedure as defined in Example 1 was conducted except that kind of core particles to be treated, addition or non-addition of an alkoxysilane compound in the coating treatment with the alkoxysilane compound, kind and amount of the alkoxysilane compound added, treating conditions of edge runner in the coating treatment, kind and amount of carbon black fine particles, and treating conditions of edge runner used in the forming process of the carbon black coat, were varied, thereby obtaining black plate-shaped ferrite composite particles with magnetoplumbite structure. The black plate-shaped ferrite composite particles with magnetoplumbite structure obtained in Examples 7 to 11 were observed by an electron microscope. As a result, almost no independent carbon black was recognized. Therefore, it was confirmed that a substantially whole amount of the carbon black used contributed to the formation of the carbon black coat on the coating layer composed of organosilane compound produced from the alkoxysilane compound.

Various properties of the carbon black fine particles A to C are shown in Table 4.

Main production conditions are shown in Table 5, and various properties of the obtained black plate-shaped ferrite composite particles with magnetoplumbite structure are shown in Table 6.

Comparative Example 6 (Example 1 of Japanese Patent Application Laid-Open (KOKAI) No. 4-157615(1992))

10 g of plate-shaped ferrite particles with magnetoplumbite structure (average particle size: 0.08 μm; average thickness: 0.011 μm; plate ratio: 7.0:1; coercive force value: 680 Oe; saturation magnetization value: 58 emu/g; blackness (L*value): 32.9; volume resistivity value: $2.8 \times 10^9$ Ω·cm) were charged into a tubular reducing furnace. While passing a water vapor-containing hydrogen gas through the reducing furnace, the plate-shaped ferrite particles with magnetoplumbite structure were heat-treated at 350° C. for 4 hours. Thereafter, the temperature of the reduction furnace was set to 250° C., and while passing a carbon dioxide gas through the reducing furnace, the plate-shaped ferrite particles with magnetoplumbite structure were further heat-treated at that temperature for 4 hours. After cooling, the thus treated particles were removed from the reducing furnace, thereby obtaining plate-shaped ferrite particles with magnetoplumbite structure on the surfaces of which carbon was deposited. It was confirmed that the amount of carbon deposited on the plate-shaped ferrite particles with magnetoplumbite structure was 6% by weight.

Various properties of the obtained carbon-deposited plate-shaped ferrite particles with magnetoplumbite structure are shown in Table 6.

Comparative Example 7 (Example 1 of Japanese Patent Application Laid-Open (KOKAI) No. 62-154228(1987))

One mole of ferric chloride ($FeCl_3$), 1/8 mole of barium chloride ($BaCl_2$), 1/20 mole of cobalt chloride ($CoCl_2$) and 1/20 mole of titanium chloride ($TiCl_4$) were dissolved in one liter of water. An aqueous sodium hydroxide solution prepared by dissolving 5 moles of sodium hydroxide in one liter of water was added to the obtained mixed solution while stirring. Next, the obtained suspension was aged for one day, thereby obtaining a precipitate. Successively, the obtained precipitate was placed in an autoclave, and heat-reacted at 300° C. for 2 hours, thereby obtaining barium ferrite particles. The obtained barium ferrite particles were washed with water and dried, and further heat-treated in air at 800° C. for 2 hours. Next, the barium ferrite particles were subjected to reduction treatment in a hydrogen gas at 250° C. for 2 hours, thereby obtaining plate-shaped barium ferrite particles.

Various properties of the obtained plate-shaped ferrite particles with magnetoplumbite structure, are shown in Table 6.

Example 12 to 19, Comparative Examples 8 to 20 <Production of Magnetic Recording Medium>

The same procedure as defined in Example 2 was conducted except for varying the kind of the plate-shaped ferrite particles with magnetoplumbite structure, the kind and amount of the carbon black fine particles, thereby producing a magnetic recording medium.

The main producing conditions and various properties are shown in Tables 7 to 8.

Examples 20 to 24 and Comparative Examples 21 to 23

The same procedure as defined in Example 3 was conducted except that kind of core particles to be treated, addition or non-addition of an polysiloxane in the coating treatment, kind and amount of the polysiloxane added, treating conditions of edge runner in the coating treatment, kind and amount of carbon black fine particles, and treating conditions of edge runner used in the forming process of the carbon black coat, were varied, thereby obtaining black plate-shaped ferrite composite particles with magnetoplumbite structure. The black plate-shaped ferrite composite particles with magnetoplumbite structure obtained in Examples 20 to 24 were observed by an electron microscope. As a result, almost no carbon black was recognized. Therefore, it was confirmed that a substantially whole amount of the carbon black used contributed to the formation of the carbon black coat on the coating layer composed of polysiloxane.

Main production conditions are shown in Table 9, and various properties of the obtained black plate-shaped ferrite composite particles with magnetoplumbite structure are shown in Table 10.

Examples 25 to 29 and Comparative Examples 24 to 26

The same procedure as defined in Example 3 was conducted except that kind of core particles to be treated, addition or non-addition of a modified polysiloxane in the coating treatment, kind and amount of the modified polysiloxane added, treating conditions of edge runner in the coating treatment, kind and amount of carbon black fine particles, and treating conditions of edge runner used in the forming process of the carbon black coat, were varied, thereby obtaining black plate-shaped ferrite composite particles with magnetoplumbite structure. The black plate-shaped ferrite composite particles with magnetoplumbite structure obtained in Examples 25 to 29 were observed by an electron microscope. As a result, almost no carbon black was recognized. Therefore, it was confirmed that a substantially whole amount of the carbon black used contributed to the formation of the carbon black coat on the coating layer composed of modified polysiloxane.

Main production conditions are shown in Table 11, and various properties of the obtained black plate-shaped ferrite composite particles with magnetoplumbite structure are shown in Table 12.

Examples 30 to 34 and Comparative Examples 27 to 29

The same procedure as defined in Example 3 was conducted except that kind of core particles to be treated, addition or non-addition of a terminal-modified polysiloxane in the coating treatment, kind and amount of the terminal-modified polysiloxane added, treating conditions of edge runner in the coating treatment, kind and amount of carbon black fine particles, and treating conditions of edge runner used in the forming process of the carbon black coat, were varied, thereby obtaining black plate-shaped ferrite composite particles with magnetoplumbite structure. The black plate-shaped ferrite composite particles with magnetoplumbite structure obtained in Examples 30 to 34 were observed by an electron microscope. As a result, almost no carbon black was recognized. Therefore, it was confirmed that a substantially whole amount of the carbon black used contributed to the formation of the carbon black coat on the coating layer composed of terminal-modified polysiloxane.

Main production conditions are shown in Table 13, and various properties of the obtained black plate-shaped ferrite composite particles with magnetoplumbite structure are shown in Table 14.

Example 35 to 58, Comparative Examples 30 to 38
<Production of Magnetic Recording Medium>

The same procedure as defined in Example 4 was conducted except for varying the kind of the black plate-shaped ferrite composite particles with magnetoplumbite structure, the kind and amount of the carbon black fine particles, thereby producing a magnetic recording medium.

The main producing conditions and various properties are shown in Tables 15 to 17.

Examples 59 to 63 and Comparative Examples 39 to 41

The same procedure as defined in Example 5 was conducted except that kind of core particles to be treated, addition or non-addition of a fluoroalkylsilane compound in the coating treatment with the fluoroalkyl organosilane compound, kind and amount of the fluoroalkylsilane compound added, treating conditions of edge runner in the coating treatment, kind and amount of carbon black fine particles, and treating conditions of edge runner used in the forming process of the carbon black coat, were varied, thereby obtaining black plate-shaped ferrite composite particles with magnetoplumbite structure. The black plate-shaped ferrite composite particles with magnetoplumbite structure obtained in Examples 59 to 63 were observed by an electron microscope. As a result, almost no carbon black was recognized. Therefore, it was confirmed that a substantially whole amount of the carbon black used contributed to the formation of the carbon black coat on the coating layer composed of fluoroalkyl organosilane compound produced from the fluoroalkylsilane compound.

Main production conditions are shown in Table 18, and various properties of the obtained black plate-shaped ferrite composite particles with magnetoplumbite structure are shown in Table 19.

Example 64 to 71, Comparative Examples 42 to 44
<Production of Magnetic Recording Medium>

The same procedure as defined in Example 6 was conducted except for varying the kind of the plate-shaped ferrite particles with magnetoplumbite structure, the kind and amount of the carbon black fine particles, thereby producing a magnetic recording medium.

The main producing conditions and various properties are shown in Table 20.

TABLE 1

| Core particles | Kind | Properties of plate-shaped ferrite particles with magnetoplumbite structure Particle shape |
|---|---|---|
| Core particles 1 | Barium ferrite particles (Ti/Fe = 3.15 mol %, Ni/Fe = 5.9 mol %) | Plate-shaped |
| Core particles 2 | Barium ferrite particles (Ti/Fe = 1.5 mol %, Ni/Fe = 2.8 mol %) | Plate-shaped |

| | Properties of plate-shaped ferrite particles with magnetoplumbite structure | | | |
|---|---|---|---|---|
| Core particles | Average particle size ($\mu$m) | Average thickness ($\mu$m) | Plate ratio (—) | Geometrical standard deviation value (—) |
| Core particles 1 | 0.050 | 0.012 | 4.2:1 | 1.35 |
| Core particles 2 | 0.032 | 0.009 | 3.6:1 | 1.40 |

TABLE 1-continued

Properties of plate-shaped ferrite particles with magnetoplumbite structure

| Core particles | BET specific surface area value ($m^2/g$) | Coercive force value (Oe) | Saturation magnetization value (emu/g) |
|---|---|---|---|
| Core particles 1 | 45.1 | 1,701 | 55.3 |
| Core particles 2 | 58.8 | 2,587 | 50.1 |

Properties of plate-shaped ferrite particles with magnetoplumbite structure

| Core particles | Volume resistivity value ($\Omega \cdot cm$) | Blackness (L* value) (–) |
|---|---|---|
| Core particles 1 | $8.6 \times 10^8$ | 32.8 |
| Core particles 2 | $6.7 \times 10^8$ | 31.6 |

TABLE 2

| Core particles | Kind of core particles | Surface-treating process Surface-treating material Kind | Calculated as | Amount (wt. %) |
|---|---|---|---|---|
| Core particles 3 | Core particles 1 | Sodium aluminate | Al | 1.0 |
| Core particles 4 | Core particles 2 | Water glass #3 | $SiO_2$ | 0.75 |
| Core particles 5 | Core particles 2 | Aluminum sulfate | Al | 2.0 |
|  |  | Water glass #3 | $SiO_2$ | 0.5 |

| Core particles | Surface-treating process Coating material Kinds | Calculated as | Amount (wt. %) |
|---|---|---|---|
| Core particles 3 | A | Al | 0.98 |
| Core particles 4 | S | $SiO_2$ | 0.72 |
| Core particles 5 | A | Al | 1.93 |
|  | S | $SiO_2$ | 0.46 |

(Note) A: Hydroxide of aluminum
S: Oxide of silicon

TABLE 3

Properties of surface-treated plate-shaped ferrite particles with magnetoplumbite structure

| Core particles | Average particle size (μm) | Average thickness (μm) | Plate ratio (–) | Geometrical standard deviation value (–) |
|---|---|---|---|---|
| Core particles 3 | 0.050 | 0.012 | 4.2:1 | 1.35 |
| Core particles 4 | 0.032 | 0.009 | 3.6:1 | 1.40 |
| Core particles 5 | 0.032 | 0.010 | 3.2:1 | 1.40 |

TABLE 3-continued

Properties of surface-treated plate-shaped ferrite particles with magnetoplumbite structure

| Core particles | BET specific surface area value ($m^2/g$) | Coercive force value (Oe) | Saturation magnetization value (emu/g) |
|---|---|---|---|
| Core particles 3 | 46.0 | 1,703 | 54.8 |
| Core particles 4 | 60.1 | 2,590 | 49.6 |
| Core particles 5 | 62.5 | 2,586 | 48.2 |

Properties of surface-treated plate-shaped ferrite particles with magnetoplumbite structure

| Core particles | Volume resistivity value ($\Omega \cdot cm$) | Blackness (L* value) (–) |
|---|---|---|
| Core particles 3 | $9.0 \times 10^8$ | 33.0 |
| Core particles 4 | $7.1 \times 10^8$ | 31.8 |
| Core particles 5 | $8.9 \times 10^8$ | 31.9 |

TABLE 4

Properties of carbon black fine particles

| Kind of carbon black fine particles | Particle shape | Average particle size (μm) | Geometrical standard deviation value (–) |
|---|---|---|---|
| Carbon black A | Granular | 0.022 | 1.78 |
| Carbon black B | Granular | 0.015 | 1.56 |
| Carbon black C | Granular | 0.030 | 2.06 |

Properties of carbon black fine particles

| Kind of carbon black fine particles | BET specific surface area value ($m^2/g$) | Blackness (L* value) (–) |
|---|---|---|
| Carbon black A | 133.5 | 14.6 |
| Carbon black B | 265.3 | 15.2 |
| Carbon black C | 84.6 | 17.0 |

TABLE 5

Production of black plate-shaped ferrite composite particles with magnetoplumbite structure Coating with alkoxysilane or silicon compound

| Examples and Comparative Examples | Kind of core particles | Alkoxysilane or silicon compound Kind | Amount added (part by weight) |
|---|---|---|---|
| Example 7 | Core particles 1 | Methyl triethoxysilane | 2.0 |
| Example 8 | Core particles 2 | Methyl trimethoxysilane | 2.0 |
| Example 9 | Core particles 3 | Dimethyl dimethoxysilane | 3.0 |
| Example 10 | Core particles 4 | Phenyl triethoxysilane | 1.0 |

TABLE 5-continued

| | | | |
|---|---|---|---|
| Example 11 | Core particles 5 | Isobutyl trimethoxysilane | 2.0 |
| Comparative Example 1 | Core particles 1 | — | — |
| Comparative Example 2 | Core particles 1 | Methyl triethoxysilane | 2.0 |
| Comparative Example 3 | Core particles 2 | Dimethyl dimethoxysilane | 1.0 |
| Comparative Example 4 | Core particles 2 | Methyl triethoxysilane | 0.005 |
| Comparative Example 5 | Core particles 1 | γ-aminopropyl triethoxysilane | 1.0 |

Production of black plate-shaped ferrite composite particles with magnetoplumbite structure
Coating with alkoxysilane or silicon compound

| Examples and Comparative Examples | Edge runner treatment | | Coating amount (calculated as Si) (wt. %) |
|---|---|---|---|
| | Linear load (Kg/cm) | Time (min) | |
| Example 7 | 60 | 30 | 0.29 |
| Example 8 | 60 | 30 | 0.40 |
| Example 9 | 30 | 30 | 0.67 |
| Example 10 | 30 | 30 | 0.10 |
| Example 11 | 45 | 45 | 0.30 |
| Comparative Example 1 | — | — | — |
| Comparative Example 2 | 30 | 30 | 0.30 |
| Comparative Example 3 | 30 | 30 | 0.23 |
| Comparative Example 4 | 30 | 30 | $7 \times 10^{-4}$ |
| Comparative Example 5 | 60 | 30 | 0.13 |

Production of black plate-shaped ferrite composite particles with magnetoplumbite structure
Coating of carbon black fine particles

| Examples and Comparative Examples | Carbon black | |
|---|---|---|
| | Kind | Amount added (part by weight) |
| Example 7 | A | 5.0 |
| Example 8 | A | 2.0 |
| Example 9 | A | 5.0 |
| Example 10 | B | 3.0 |
| Example 11 | C | 1.0 |
| Comparative Example 1 | A | 2.0 |
| Comparative Example 2 | — | — |
| Comparative Example 3 | A | 0.01 |
| Comparative Example 4 | B | 1.5 |
| Comparative Example 5 | C | 2.0 |

TABLE 5-continued

Production of black plate-shaped ferrite composite particles with magnetoplumbite structure
Coating of carbon black

| Examples and Comparative Examples | Edge runner treatment | | Amount of carbon black coat (calculated as C) (wt. %) |
|---|---|---|---|
| | Linear load (Kg/cm) | Time (min) | |
| Example 7 | 60 | 30 | |
| Example 8 | 30 | 30 | |
| Example 9 | 60 | 30 | |
| Example 10 | 30 | 45 | |
| Example 11 | 60 | 30 | |
| Comparative Example 1 | 30 | 30 | |
| Comparative Example 2 | — | — | |
| Comparative Example 3 | 30 | 30 | |
| Comparative Example 4 | 30 | 30 | |
| Comparative Example 5 | 60 | 30 | |

Note: A: Carbon black A described in Table 4.
B: Carbon black B described in Table 4.
C: Carbon black C described in Table 4.

TABLE 6

Properties of black plate-shaped ferrite composite particles with magnetoplumbite structure

| Examples and Comparative Examples | Average particle size (μm) | Average thickness (μm) | Plate ratio (—) | Geometrical standard deviation value (—) |
|---|---|---|---|---|
| Example 7 | 0.051 | 0.012 | 4.3:1 | 1.36 |
| Example 8 | 0.033 | 0.010 | 3.3:1 | 1.41 |
| Example 9 | 0.051 | 0.013 | 3.9:1 | 1.36 |
| Example 10 | 0.033 | 0.010 | 3.3:1 | 1.40 |
| Example 11 | 0.032 | 0.010 | 3.2:1 | 1.40 |
| Comparative Example 1 | 0.050 | 0.013 | 3.8:1 | — |
| Comparative Example 2 | 0.050 | 0.012 | 4.2:1 | 1.36 |
| Comparative Example 3 | 0.032 | 0.009 | 3.6:1 | — |
| Comparative Example 4 | 0.033 | 0.010 | 3.3:1 | — |
| Comparative Example 5 | 0.051 | 0.013 | 3.9:1 | — |
| Comparative Example 6 | 0.081 | 0.012 | 6.8:1 | 1.40 |
| Comparative Example 7 | 0.080 | 0.012 | 6.7:1 | 1.45 |

Properties of black plate-shaped ferrite composite particles with magnetoplumbite structure

| Examples and Comparative Examples | BET specific surface area value (m²/g) | Coercive force value (Oe) | Saturation magnetization value (emu/g) |
|---|---|---|---|
| Example 7 | 47.1 | 1,713 | 51.6 |
| Example 8 | 59.9 | 2,601 | 48.1 |
| Example 9 | 47.8 | 1,709 | 48.8 |
| Example 10 | 58.9 | 2,596 | 47.6 |

TABLE 6-continued

| | | | |
|---|---|---|---|
| Example 11 | 59.3 | 2,589 | 48.4 |
| Comparative Example 1 | 50.1 | 1,704 | 54.1 |
| Comparative Example 2 | 43.6 | 1,712 | 55.0 |
| Comparative Example 3 | 58.9 | 2,610 | 48.6 |
| Comparative Example 4 | 59.6 | 2,592 | 47.6 |
| Comparative Example 5 | 63.8 | 1,698 | 52.6 |
| Comparative Example 6 | 35.8 | 690 | 57.0 |
| Comparative Example 7 | 31.2 | 650 | 58.3 |

Properties of black plate-shaped ferrite composite particles with magnetoplumbite structure

| Examples and Comparative Examples | Volume resistivity value ($\Omega \cdot cm$) | Blackness (L* value) (—) | Carbon black desorption percentage (%) | Thickness of carbon black coat ($\mu m$) |
|---|---|---|---|---|
| Example 7 | $3.6 \times 10^6$ | 22.1 | 3.8 | 0.0022 |
| Example 8 | $8.1 \times 10^6$ | 23.6 | 4.6 | 0.0020 |
| Example 9 | $1.6 \times 10^6$ | 21.6 | 2.1 | 0.0022 |
| Example 10 | $5.6 \times 10^6$ | 23.8 | 5.6 | 0.0021 |
| Example 11 | $3.6 \times 10^6$ | 24.6 | 1.8 | 0.0019 |
| Comparative Example 1 | $8.9 \times 10^7$ | 27.6 | 68.3 | — |
| Comparative Example 2 | $8.6 \times 10^9$ | 33.6 | — | — |
| Comparative Example 3 | $1.3 \times 10^9$ | 30.6 | — | — |
| Comparative Example 4 | $7.3 \times 10^7$ | 28.3 | 45.6 | — |
| Comparative Example 5 | $9.1 \times 10^7$ | 27.2 | 28.2 | — |
| Comparative Example 6 | $5.3 \times 10^7$ | 27.6 | 36.5 | — |
| Comparative Example 7 | $6.4 \times 10^7$ | 28.3 | — | — |

Properties of black plate-shaped ferrite composite particles with magnetoplumbite structure

| Examples and Comparative Examples | Percentage of change in coercive force value (%) | $Fe^{2+}/Fe^{3+}$ (—) |
|---|---|---|
| Example 7 | 0.0 | 0.0 |
| Example 8 | 0.0 | 0.0 |
| Example 9 | 0.0 | 0.0 |
| Example 10 | 0.0 | 0.0 |
| Example 11 | 0.0 | 0.0 |
| Comparative Example 1 | 0.0 | 0.0 |
| Comparative Example 2 | 0.0 | 0.0 |
| Comparative Example 3 | 0.0 | 0.0 |
| Comparative Example 4 | 0.0 | 0.0 |
| Comparative Example 5 | 0.0 | 0.0 |
| Comparative Example 6 | 1.4 | 0.021 |
| Comparative Example 7 | 13.6 | 0.084 |

TABLE 7

Production of magnetic coating composition

| Examples | Kind of black plate-shaped ferrite composite particles with magnetoplumbite structure | Weight ratio of magnetic particles to resin (—) |
|---|---|---|
| Example 12 | Example 7 | 5.0 |
| Example 13 | Example 8 | 5.0 |
| Example 14 | Example 9 | 5.0 |
| Example 15 | Example 10 | 5.0 |
| Example 16 | Example 11 | 5.0 |
| Example 17 | Example 7 | 5.0 |
| Example 18 | Example 9 | 5.0 |
| Example 19 | Example 11 | 5.0 |

Production of magnetic coating composition

| Examples | Amount of carbon black fine particles added (weight ratio to magnetic particles) (—) | Properties of magnetic coating composition Viscosity (cP) |
|---|---|---|
| Example 12 | 1.0 | 2,560 |
| Example 13 | 1.0 | 3,738 |
| Example 14 | 1.0 | 2,790 |
| Example 15 | 1.0 | 3,866 |
| Example 16 | 1.0 | 3,994 |
| Example 17 | 0.0 | 2,944 |
| Example 18 | 2.5 | 2,816 |
| Example 19 | 1.5 | 3,891 |

Properties of magnetic recording medium

| Examples | Thickness of magnetic layer ($\mu m$) | Coercive force value (Oe) | Br/Bm value (—) | Gloss (%) |
|---|---|---|---|---|
| Example 12 | 3.5 | 1,728 | 0.89 | 180 |
| Example 13 | 3.6 | 2,626 | 0.88 | 186 |
| Example 14 | 3.4 | 1,732 | 0.89 | 181 |
| Example 15 | 3.5 | 2,630 | 0.88 | 189 |
| Example 16 | 3.6 | 2,626 | 0.88 | 193 |
| Example 17 | 3.5 | 1,732 | 0.90 | 188 |
| Example 18 | 3.6 | 1,742 | 0.89 | 182 |
| Example 19 | 3.6 | 2,646 | 0.88 | 190 |

Properties of magnetic recording medium

| Examples | Surface roughness Ra (nm) | Young's modulus (relative value) | Linear absorption ($\mu m^{-1}$) | Surface resistivity value ($\Omega$/sq) |
|---|---|---|---|---|
| Example 12 | 8.3 | 143 | 1.48 | $1.4 \times 10^8$ |
| Example 13 | 6.9 | 136 | 1.35 | $6.6 \times 10^8$ |
| Example 14 | 8.8 | 142 | 1.49 | $2.8 \times 10^8$ |
| Example 15 | 6.9 | 135 | 1.41 | $2.1 \times 10^9$ |
| Example 16 | 7.2 | 137 | 1.32 | $8.3 \times 10^8$ |
| Example 17 | 7.6 | 144 | 1.51 | $1.6 \times 10^9$ |
| Example 18 | 8.9 | 144 | 1.59 | $1.0 \times 10^8$ |
| Example 19 | 8.0 | 136 | 1.36 | $6.9 \times 10^8$ |

TABLE 8

| Comparative Examples | Production of magnetic coating composition — Kind of plate-shaped ferrite composite particles with magnetoplumbite structure | Weight ratio of magnetic particles to resin (−) | Production of magnetic coating composition — Amount of carbon black fine particles added (weight ratio to magnetic particles) (−) | Properties of magnetic coating composition Viscosity (cP) | Thickness of magnetic layer (μm) | Coercive force value (Oe) | Br/Bm value (−) | Gloss (%) | Surface roughness Ra (nm) | Young's modulus (relative value) | Linear absorption ($\mu m^{-1}$) | Surface resistivity value (Ω/sq) |
|---|---|---|---|---|---|---|---|---|---|---|---|---|
| Comparative Example 8 | Core particles 1 | 5.0 | 1.0 | 2,048 | 3.5 | 1,710 | 0.84 | 160 | 14.6 | 133 | 0.62 | $6.2 \times 10^{13}$ |
| Comparative Example 9 | Core particles 2 | 5.0 | 1.0 | 2,816 | 3.5 | 2,597 | 0.80 | 163 | 13.6 | 116 | 0.52 | $2.2 \times 10^{13}$ |
| Comparative Example 10 | Comparative Example 1 | 5.0 | 1.0 | 5,888 | 3.5 | 1,713 | 0.76 | 163 | 13.2 | 131 | 1.13 | $4.1 \times 10^{11}$ |
| Comparative Example 11 | Comparative Example 2 | 5.0 | 1.0 | 2,048 | 3.5 | 1,705 | 0.78 | 158 | 14.3 | 130 | 0.64 | $8.3 \times 10^{11}$ |
| Comparative Example 12 | Comparative Example 3 | 5.0 | 1.0 | 2,816 | 3.4 | 2,601 | 0.78 | 163 | 12.8 | 121 | 0.63 | $6.5 \times 10^{11}$ |
| Comparative Example 13 | Comparative Example 4 | 5.0 | 1.0 | 4,122 | 3.6 | 2,611 | 0.73 | 161 | 12.9 | 119 | 1.18 | $7.1 \times 10^{10}$ |
| Comparative Example 14 | Comparative Example 5 | 5.0 | 1.0 | 3,866 | 3.5 | 1,715 | 0.75 | 142 | 36.8 | 134 | 1.13 | $4.4 \times 10^{11}$ |
| Comparative Example 15 | Comparative Example 6 | 5.0 | 1.0 | 3,328 | 3.5 | 738 | 0.78 | 150 | 21.3 | 133 | 1.10 | $8.6 \times 10^{10}$ |
| Comparative Example 16 | Comparative Example 7 | 5.0 | 1.0 | 6,016 | 3.6 | 698 | 0.76 | 145 | 31.2 | 130 | 0.98 | $5.4 \times 10^{10}$ |
| Comparative Example 17 | Core particles 1 | 5.0 | 5.5 | 6,477 | 3.7 | 1,726 | 0.83 | 164 | 14.4 | 133 | 1.26 | $9.1 \times 10^{10}$ |
| Comparative Example 18 | Core particles 1 | 5.0 | 10.0 | 5,632 | 3.7 | 1,703 | 0.79 | 131 | 36.8 | 116 | 1.40 | $5.7 \times 10^{9}$ |
| Comparative Example 19 | Core particles 2 | 5.0 | 5.5 | 11,008 | 3.8 | 2,603 | 0.81 | 168 | 12.0 | 110 | 1.10 | $7.1 \times 10^{10}$ |
| Comparative Example 20 | Core particles 2 | 5.0 | 10.0 | 10,240 | 3.6 | 2,608 | 0.72 | 140 | 41.6 | 98 | 1.36 | $5.5 \times 10^{9}$ |

TABLE 9

Production of black plate-shaped ferrite composite particles with magnetoplumbite structure
Coating with polysiloxane

| Examples and Comparative Examples | Kind of core particles | Polysiloxane Kind | Amount added (part by weight) |
|---|---|---|---|
| Example 20 | Core particles 1 | TSF484 | 1.0 |
| Example 21 | Core particles 2 | TSF484 | 5.0 |
| Example 22 | Core particles 3 | KF99 | 2.0 |
| Example 23 | Core particles 4 | L-9000 | 1.0 |
| Example 24 | Core particles 5 | TSF484/L-45 | 0.5/1.5 |
| Comparative Example 21 | Core particles 1 | TSF484 | 1.0 |
| Comparative Example 22 | Core particles 2 | TSF484 | 0.5 |
| Comparative Example 23 | Core particles 2 | TSF484 | 0.005 |

Production of black plate-shaped ferrite composite particles with magnetoplumbite structure
Coating with polysiloxane

| Examples and Comparative Examples | Edge runner treatment Linear load (Kg/cm) | Time (min) | Coating amount (calculated as Si) (wt. %) |
|---|---|---|---|
| Example 20 | 60 | 30 | 0.43 |
| Example 21 | 30 | 30 | 2.12 |
| Example 22 | 60 | 20 | 0.85 |
| Example 23 | 30 | 45 | 0.43 |
| Example 24 | 60 | 30 | 0.70 |
| Comparative Example 21 | 60 | 20 | 0.44 |
| Comparative Example 22 | 60 | 30 | 0.22 |
| Comparative Example 23 | 60 | 30 | $2 \times 10^{-3}$ |

Production of black plate-shaped ferrite composite particles with magnetoplumbite structure
Coating of carbon black fine particles

| Examples and Comparative Examples | Carbon black Kind | Amount added (part by weight) |
|---|---|---|
| Example 20 | A | 10.0 |
| Example 21 | A | 3.0 |
| Example 22 | A | 5.0 |
| Example 23 | B | 10.0 |
| Example 24 | C | 7.5 |
| Comparative Example 21 | — | — |
| Comparative Example 22 | A | 0.01 |
| Comparative Example 23 | B | 3.0 |

TABLE 9-continued

Production of black plate-shaped ferrite composite particles with magnetoplumbite structure
Coating of carbon black

| Examples and Comparative Examples | Edge runner treatment Linear load (Kg/cm) | Time (min) | Amount of carbon black coat (calculated as C) (wt. %) |
|---|---|---|---|
| Example 20 | 60 | 30 | 9.08 |
| Example 21 | 45 | 45 | 2.90 |
| Example 22 | 45 | 20 | 4.76 |
| Example 23 | 30 | 45 | 9.09 |
| Example 24 | 60 | 20 | 6.95 |
| Comparative Example 21 | — | — | — |
| Comparative Example 22 | 60 | 30 | 0.01 |
| Comparative Example 23 | 60 | 30 | 2.91 |

Note: A: Carbon black A described in Table 4.
B: Carbon black B described in Table 4.
C: Carbon black C described in Table 4.

TABLE 10

Properties of black plate-shaped ferrite composite particles with magnetoplumbite structure

| Examples and Comparative Examples | Average particle size (μm) | Average thickness (μm) | Plate ratio (—) | Geometrical standard deviation value (—) |
|---|---|---|---|---|
| Example 20 | 0.050 | 0.012 | 4.2:1 | 1.35 |
| Example 21 | 0.032 | 0.009 | 3.6:1 | 1.41 |
| Example 22 | 0.050 | 0.012 | 4.2:1 | 1.35 |
| Example 23 | 0.032 | 0.009 | 3.6:1 | 1.40 |
| Example 24 | 0.032 | 0.010 | 3.2:1 | 1.40 |
| Comparative Example 21 | 0.050 | 0.012 | 4.2:1 | 1.36 |
| Comparative Example 22 | 0.032 | 0.009 | 3.6:1 | — |
| Comparative Example 23 | 0.032 | 0.009 | 3.6:1 | — |

Properties of black plate-shaped ferrite composite particles with magnetoplumbite structure

| Examples and Comparative Examples | BET specific surface area value (m²/g) | Coercive force value (Oe) | Saturation magnetization value (emu/g) |
|---|---|---|---|
| Example 20 | 45.9 | 1,712 | 52.9 |
| Example 21 | 59.2 | 2,583 | 48.1 |
| Example 22 | 44.9 | 1,710 | 51.3 |
| Example 23 | 58.9 | 2,576 | 48.0 |
| Example 24 | 60.3 | 2,583 | 47.9 |
| Comparative Example 21 | 48.1 | 1,711 | 53.9 |
| Comparative Example 22 | 57.6 | 2,581 | 49.3 |
| Comparative Example 23 | 63.0 | 2,580 | 48.6 |

TABLE 10-continued

Properties of black plate-shaped ferrite composite particles with magnetoplumbite structure

| Examples and Comparative Examples | Volume resistivity value ($\Omega \cdot$ cm) | Blackness (L* value) (-) | Carbon black desorption percentage (%) | Thickness of carbon black coat ($\mu$m) |
|---|---|---|---|---|
| Example 20 | $4.4 \times 10^6$ | 22.0 | 4.1 | 0.0024 |
| Example 21 | $9.6 \times 10^6$ | 24.3 | 3.8 | 0.0021 |
| Example 22 | $1.9 \times 10^6$ | 21.6 | 1.9 | 0.0022 |
| Example 23 | $4.2 \times 10^6$ | 24.2 | 7.4 | 0.0024 |
| Example 24 | $2.1 \times 10^6$ | 24.1 | 1.9 | 0.0023 |
| Comparative Example 21 | $7.0 \times 10^9$ | 33.3 | — | — |
| Comparative Example 22 | $2.9 \times 10^9$ | 30.6 | — | — |
| Comparative Example 23 | $8.4 \times 10^7$ | 29.1 | 44.4 | — |

Properties of black plate-shaped ferrite composite particles with magnetoplumbite structure

| Examples and Comparative Examples | Percentage of change in coercive force value (%) | $Fe^{2+}/Fe^{3+}$ (-) |
|---|---|---|
| Example 20 | 0.0 | 0.0 |
| Example 21 | 0.0 | 0.0 |
| Example 22 | 0.0 | 0.0 |
| Example 23 | 0.0 | 0.0 |
| Example 24 | 0.0 | 0.0 |
| Comparative Example 21 | 0.0 | 0.0 |
| Comparative Example 22 | 0.0 | 0.0 |
| Comparative Example 23 | 0.0 | 0.0 |

TABLE 11

Production of black plate-shaped ferrite composite particles with magnetoplumbite structure Coating with modified polysiloxane

| Examples and Comparative Examples | Kind of core particles | Modified polysiloxane Kind | Amount added (part by weight) |
|---|---|---|---|
| Example 25 | Core particles 1 | BYK-080 | 1.0 |
| Example 26 | Core particles 2 | BYK-310 | 2.0 |
| Example 27 | Core particles 3 | BYK-222 | 5.0 |
| Example 28 | Core particles 4 | TSF4446 | 1.0 |
| Example 29 | Core particles 5 | YF3965 | 1.0 |
| Comparative Example 24 | Core particles 1 | BYK-080 | 1.0 |
| Comparative Example 25 | Core particles 2 | BYK-080 | 0.5 |
| Comparative Example 26 | Core particles 2 | BYK-080 | 0.005 |

TABLE 11-continued

Production of black plate-shaped ferrite composite particles with magnetoplumbite structure Coating with modified polysiloxane

| Examples and Comparative Examples | Edge runner treatment Linear load (Kg/cm) | Time (min) | Coating amount (calculated as Si) (wt. %) |
|---|---|---|---|
| Example 25 | 60 | 20 | 0.18 |
| Example 26 | 30 | 30 | 0.33 |
| Example 27 | 60 | 30 | 0.86 |
| Example 28 | 45 | 30 | 0.17 |
| Example 29 | 60 | 20 | 0.16 |
| Comparative Example 24 | 30 | 30 | 0.17 |
| Comparative Example 25 | 60 | 30 | 0.08 |
| Comparative Example 26 | 45 | 30 | $6 \times 10^{-4}$ |

Production of black plate-shaped ferrite composite particles with magnetoplumbite structure Coating of carbon black fine particles

| Examples and Comparative Examples | Carbon black Kind | Amount added (part by weight) |
|---|---|---|
| Example 25 | A | 7.5 |
| Example 26 | A | 5.0 |
| Example 27 | A | 10.0 |
| Example 28 | B | 10.0 |
| Example 29 | C | 5.0 |
| Comparative Example 24 | — | — |
| Comparative Example 25 | A | 0.01 |
| Comparative Example 26 | B | 5.0 |

Production of black plate-shaped ferrite composite particles with magnetoplumbite structure Coating of carbon black

| Examples and Comparative Examples | Edge runner treatment Linear load (Kg/cm) | Time (min) | Amount of carbon black coat (calculated as C) (wt. %) |
|---|---|---|---|
| Example 25 | 60 | 30 | 6.96 |
| Example 26 | 45 | 30 | 4.76 |
| Example 27 | 30 | 45 | 9.09 |
| Example 28 | 60 | 45 | 9.08 |
| Example 29 | 60 | 30 | 4.75 |
| Comparative Example 24 | — | — | — |
| Comparative Example 25 | 60 | 30 | 0.01 |
| Comparative Example 26 | 60 | 30 | 4.74 |

Note: A: Carbon black A described in Table 4.
B: Carbon black B described in Table 4.
C: Carbon black C described in Table 4.

TABLE 12

Properties of black plate-shaped ferrite composite particles with magnetoplumbite structure

| Examples and Comparative Examples | Average particle size (μm) | Average thickness (μm) | Plate ratio (-) | Geometrical standard deviation value (-) |
|---|---|---|---|---|
| Example 25 | 0.050 | 0.012 | 4.2:1 | 1.35 |
| Example 26 | 0.032 | 0.009 | 3.6:1 | 1.40 |
| Example 27 | 0.050 | 0.012 | 4.2:1 | 1.36 |
| Example 28 | 0.032 | 0.009 | 3.6:1 | 1.41 |
| Example 29 | 0.032 | 0.010 | 3.2:1 | 1.40 |
| Comparative Example 24 | 0.050 | 0.012 | 4.2:1 | 1.35 |
| Comparative Example 25 | 0.032 | 0.009 | 3.6:1 | 1.40 |
| Comparative Example 26 | 0.032 | 0.009 | 3.6:1 | 1.40 |

Properties of black plate-shaped ferrite composite particles with magnetoplumbite structure

| Examples and Comparative Examples | BET specific surface area value ($m^2/g$) | Coercive force value (Oe) | Saturation magnetization value (emu/g) |
|---|---|---|---|
| Example 25 | 45.9 | 1,710 | 52.9 |
| Example 26 | 58.9 | 2,588 | 48.5 |
| Example 27 | 46.1 | 1,706 | 51.3 |
| Example 28 | 58.2 | 2,573 | 48.3 |
| Example 29 | 58.0 | 2,584 | 47.9 |
| Comparative Example 24 | 47.1 | 1,705 | 54.1 |
| Comparative Example 25 | 58.3 | 2,580 | 49.2 |
| Comparative Example 26 | 62.1 | 2,578 | 48.4 |

Properties of black plate-shaped ferrite composite particles with magnetoplumbite structure

| Examples and Comparative Examples | Volume resistivity value (Ω·cm) | Blackness (L* value) (-) | Carbon black desorption percentage (%) | Thickness of carbon black coat (μm) |
|---|---|---|---|---|
| Example 25 | $2.1 \times 10^6$ | 22.1 | 4.3 | 0.0023 |
| Example 26 | $7.6 \times 10^6$ | 23.9 | 4.6 | 0.0022 |
| Example 27 | $2.8 \times 10^6$ | 21.4 | 2.2 | 0.0024 |
| Example 28 | $6.3 \times 10^6$ | 24.0 | 7.5 | 0.0024 |
| Example 29 | $4.1 \times 10^6$ | 23.6 | 3.6 | 0.0022 |
| Comparative Example 24 | $9.3 \times 10^7$ | 33.8 | — | — |
| Comparative Example 25 | $2.4 \times 10^9$ | 30.6 | — | — |
| Comparative Example 26 | $6.5 \times 10^9$ | 28.4 | 48.3 | — |

Properties of black plate-shaped ferrite composite particles with magnetoplumbite structure

| Examples and Comparative Examples | Percentage of change in coercive force value (%) | $Fe^{2+}/Fe^{3+}$ (-) |
|---|---|---|
| Example 25 | 0.0 | 0.0 |
| Example 26 | 0.0 | 0.0 |
| Example 27 | 0.0 | 0.0 |
| Example 28 | 0.0 | 0.0 |
| Example 29 | 0.0 | 0.0 |
| Comparative Example 24 | 0.0 | 0.0 |
| Comparative Example 25 | 0.0 | 0.0 |
| Comparative Example 26 | 0.0 | 0.0 |

TABLE 13

Production of black plate-shaped ferrite composite particles with magnetoplumbite structure — Coating with terminal modified polysiloxane

| Examples and Comparative Examples | Kind of core particles | Terminal-modified polysiloxane Kind | Amount added (part by weight) |
|---|---|---|---|
| Example 30 | Core particles 1 | TSF4770 | 2.0 |
| Example 31 | Core particles 2 | TSF4770 | 1.0 |
| Example 32 | Core particles 3 | TSF4751 | 0.5 |
| Example 33 | Core particles 4 | XF3905 | 5.0 |
| Example 34 | Core particles 5 | YF3804 | 2.0 |
| Comparative Example 27 | Core particles 1 | TSF4770 | 1.0 |
| Comparative Example 28 | Core particles 2 | TSF4770 | 1.0 |
| Comparative Example 29 | Core particles 2 | TSF4770 | 0.005 |

Production of black plate-shaped ferrite composite particles with magnetoplumbite structure — Coating with terminal-modified polysiloxane

| Examples and Comparative Examples | Edge runner treatment Linear load (Kg/cm) | Time (min) | Coating amount (calculated as Si) (wt. %) |
|---|---|---|---|
| Example 30 | 60 | 30 | 0.68 |
| Example 31 | 30 | 45 | 0.34 |
| Example 32 | 60 | 30 | 0.18 |
| Example 33 | 45 | 30 | 1.75 |
| Example 34 | 60 | 20 | 0.40 |
| Comparative Example 27 | 60 | 30 | 0.35 |
| Comparative Example 28 | 60 | 30 | 0.34 |
| Comparative Example 29 | 45 | 30 | $2 \times 10^{-3}$ |

Production of black plate-shaped ferrite composite particles with magnetoplumbite structure — Coating of carbon black fine particles

| Examples and Comparative Examples | Carbon black Kind | Amount added (part by weight) |
|---|---|---|
| Example 30 | A | 10.0 |
| Example 31 | A | 5.0 |

TABLE 13-continued

| | | |
|---|---|---|
| Example 32 | A | 7.5 |
| Example 33 | B | 10.0 |
| Example 34 | C | 7.5 |
| Comparative Example 27 | — | — |
| Comparative Example 28 | A | 0.01 |
| Comparative Example 29 | B | 5.0 |

Note:
A: Carbon black A described in Table 4.
B: Carbon black B described in Table 4.
C: Carbon black C described in Table 4.

Production of black plate-shaped ferrite composite particles with magnetoplumbite structure
Coating of carbon black

| Examples and Comparative Examples | Edge runner treatment | | Amount of carbon black coat (calculated as C) (wt. %) |
|---|---|---|---|
| | Linear load (Kg/cm) | Time (min) | |
| Example 30 | 60 | 30 | 9.08 |
| Example 31 | 30 | 60 | 4.76 |
| Example 32 | 45 | 30 | 6.95 |
| Example 33 | 60 | 30 | 9.09 |
| Example 34 | 75 | 20 | 6.97 |
| Comparative Example 27 | — | — | — |
| Comparative Example 28 | 60 | 30 | 0.01 |
| Comparative Example 29 | 60 | 30 | 4.75 |

TABLE 14

Properties of black plate-shaped ferrite composite particles with magnetoplumbite structure

| Examples and Comparative Examples | Average particle size (μm) | Average thickness (μm) | Plate ratio (–) | Geometrical standard deviation value (–) |
|---|---|---|---|---|
| Example 30 | 0.050 | 0.012 | 4.2:1 | 1.35 |
| Example 31 | 0.032 | 0.009 | 3.6:1 | 1.40 |
| Example 32 | 0.050 | 0.012 | 4.2:1 | 1.36 |
| Example 33 | 0.032 | 0.009 | 3.6:1 | 1.40 |
| Example 34 | 0.032 | 0.010 | 3.2:1 | 1.40 |
| Comparative Example 27 | 0.050 | 0.012 | 4.2:1 | 1.35 |
| Comparative Example 28 | 0.032 | 0.009 | 3.6:1 | 1.40 |
| Comparative Example 29 | 0.032 | 0.009 | 3.6:1 | 1.40 |

Properties of black plate-shaped ferrite composite particles with magnetoplumbite structure

| Examples and Comparative Examples | BET specific surface area value ($m^2/g$) | Coercive force value (Oe) | Saturation magnetization value (emu/g) |
|---|---|---|---|
| Example 30 | 46.4 | 1,714 | 52.9 |
| Example 31 | 59.3 | 2,577 | 48.6 |
| Example 32 | 45.9 | 1,720 | 51.8 |
| Example 33 | 58.9 | 2,576 | 48.5 |
| Example 34 | 59.3 | 2,573 | 48.5 |
| Comparative Example 27 | 47.6 | 1,710 | 54.3 |
| Comparative Example 28 | 58.6 | 2,570 | 49.0 |
| Comparative Example 29 | 62.1 | 2,575 | 48.6 |

Properties of black plate-shaped ferrite composite particles with magnetoplumbite structure

| Examples and Comparative Examples | Volume resistivity value (Ω·cm) | Blackness (L* value) (–) | Carbon black desorption percentage (%) | Thickness of carbon black coat (μm) |
|---|---|---|---|---|
| Example 30 | $4.1 \times 10^6$ | 22.3 | 3.0 | 0.0024 |
| Example 31 | $7.4 \times 10^6$ | 24.0 | 4.9 | 0.0022 |
| Example 32 | $3.6 \times 10^6$ | 21.5 | 2.2 | 0.0023 |
| Example 33 | $5.1 \times 10^6$ | 23.9 | 8.8 | 0.0024 |
| Example 34 | $2.7 \times 10^6$ | 23.6 | 1.6 | 0.0023 |
| Comparative Example 27 | $8.3 \times 10^7$ | 33.3 | — | — |
| Comparative Example 28 | $2.2 \times 10^9$ | 29.9 | — | — |
| Comparative Example 29 | $6.9 \times 10^9$ | 28.3 | 44.4 | — |

Properties of black plate-shaped ferrite composite particles with magnetoplumbite structure

| Examples and Comparative Examples | Percentage of change in coercive force value (%) | $Fe^{2+}/Fe^{3+}$ (–) |
|---|---|---|
| Example 30 | 0.0 | 0.0 |
| Example 31 | 0.0 | 0.0 |
| Example 32 | 0.0 | 0.0 |
| Example 33 | 0.0 | 0.0 |
| Example 34 | 0.0 | 0.0 |
| Comparative Example 27 | 0.0 | 0.0 |
| Comparative Example 28 | 0.0 | 0.0 |
| Comparative Example 29 | 0.0 | 0.0 |

TABLE 15

Production of magnetic coating composition

| Examples and Comparative Examples | Kind of black plate-shaped ferrite composite particles with magnetoplumbite structure | Weight ratio of magnetic particles to resin (–) |
|---|---|---|
| Example 35 | Example 20 | 5.0 |
| Example 36 | Example 21 | 5.0 |
| Example 37 | Example 22 | 5.0 |
| Example 38 | Example 23 | 5.0 |
| Example 39 | Example 24 | 5.0 |
| Example 40 | Example 20 | 5.0 |
| Example 41 | Example 22 | 5.0 |
| Example 42 | Example 24 | 5.0 |
| Comparative Example 30 | Comparative Example 21 | 5.0 |
| Comparative Example 31 | Comparative Example 22 | 5.0 |
| Comparative Example 32 | Comparative Example 23 | 5.0 |

TABLE 15-continued

| Examples and Comparative Examples | Production of magnetic coating composition Amount of carbon black fine particles added (weight ratio to magnetic particles) (−) | Properties of magnetic coating composition Viscosity (cP) |
|---|---|---|
| Example 35 | 1.0 | 2,944 |
| Example 36 | 1.0 | 2,790 |
| Example 37 | 1.0 | 2,560 |
| Example 38 | 1.0 | 3,891 |
| Example 39 | 1.0 | 2,560 |
| Example 40 | 0.0 | 2,790 |
| Example 41 | 2.5 | 3,738 |
| Example 42 | 1.5 | 2,790 |
| Comparative Example 30 | 1.0 | 3,815 |
| Comparative Example 31 | 1.0 | 3,738 |
| Comparative Example 32 | 1.0 | 2,920 |

| Examples and Comparative Examples | Properties of magnetic recording medium | | | |
|---|---|---|---|---|
| | Thickness of magnetic layer (μm) | Coercive force value (Oe) | Br/Bm value (−) | Gloss (%) |
| Example 35 | 3.5 | 1,733 | 0.89 | 183 |
| Example 36 | 3.5 | 2,682 | 0.89 | 185 |
| Example 37 | 3.5 | 1,730 | 0.90 | 181 |
| Example 38 | 3.5 | 2,680 | 0.89 | 181 |
| Example 39 | 3.5 | 2,678 | 0.89 | 183 |
| Example 40 | 3.4 | 1,736 | 0.89 | 191 |
| Example 41 | 3.6 | 1,730 | 0.88 | 186 |
| Example 42 | 3.5 | 2,656 | 0.89 | 183 |
| Comparative Example 30 | 3.5 | 1,712 | 0.78 | 159 |
| Comparative Example 31 | 3.5 | 2,615 | 0.78 | 161 |
| Comparative Example 32 | 3.5 | 2,621 | 0.74 | 162 |

| Examples and Comparative Examples | Properties of magnetic recording medium | | | |
|---|---|---|---|---|
| | Surface roughness Ra (nm) | Young's modulus (relative value) | Linear absorption (μm$^{-1}$) | Surface resistivity value (Ω/sq) |
| Example 35 | 7.2 | 144 | 1.48 | $2.4 \times 10^8$ |
| Example 36 | 6.8 | 135 | 1.36 | $7.6 \times 10^8$ |
| Example 37 | 7.9 | 143 | 1.49 | $3.1 \times 10^8$ |
| Example 38 | 8.3 | 136 | 1.42 | $2.8 \times 10^9$ |
| Example 39 | 7.9 | 135 | 1.56 | $9.1 \times 10^8$ |
| Example 40 | 6.0 | 141 | 1.41 | $3.3 \times 10^8$ |
| Example 41 | 8.4 | 143 | 1.58 | $1.6 \times 10^8$ |
| Example 42 | 7.9 | 136 | 1.51 | $7.1 \times 10^8$ |
| Comparative Example 30 | 14.2 | 130 | 0.63 | $9.2 \times 10^{11}$ |
| Comparative Example 31 | 13.2 | 125 | 0.62 | $7.3 \times 10^{11}$ |
| Comparative Example 32 | 13.3 | 121 | 1.13 | $7.1 \times 10^{10}$ |

TABLE 16

| Examples and Comparative Examples | Production of magnetic coating composition Kind of black plate-shaped ferrite composite particles with magnetoplumbite structure | Weight ratio of magnetic particles to resin (−) |
|---|---|---|
| Example 43 | Example 25 | 5.0 |
| Example 44 | Example 26 | 5.0 |
| Example 45 | Example 27 | 5.0 |
| Example 46 | Example 28 | 5.0 |
| Example 47 | Example 29 | 5.0 |
| Example 48 | Example 25 | 5.0 |
| Example 49 | Example 27 | 5.0 |
| Example 50 | Example 29 | 5.0 |
| Comparative Example 33 | Comparative Example 24 | 5.0 |
| Comparative Example 34 | Example 25 | 5.0 |
| Comparative Example 35 | Comparative Example 26 | 5.0 |

| Examples and Comparative Examples | Production of magnetic coating composition Amount of carbon black fine particles added (weight ratio to magnetic particles) (−) | Properties of magnetic coating composition Viscosity (cP) |
|---|---|---|
| Example 43 | 1.0 | 3,891 |
| Example 44 | 1.0 | 2,790 |
| Example 45 | 1.0 | 3,866 |
| Example 46 | 1.0 | 3,738 |
| Example 47 | 1.0 | 2,944 |
| Example 48 | 0.0 | 2,560 |
| Example 49 | 2.5 | 3,891 |
| Example 50 | 1.5 | 2,816 |
| Comparative Example 33 | 1.0 | 2,790 |
| Comparative Example 34 | 1.0 | 2,944 |
| Comparative Example 35 | 1.0 | 2,560 |

| Examples and Comparative Examples | Properties of magnetic recording medium | | | |
|---|---|---|---|---|
| | Thickness of magnetic layer (μm) | Coercive force value (Oe) | Br/Bm value (−) | Gloss (%) |
| Example 43 | 3.5 | 1,732 | 0.90 | 184 |
| Example 44 | 3.5 | 2,670 | 0.89 | 186 |
| Example 45 | 3.4 | 1,728 | 0.90 | 188 |
| Example 46 | 3.5 | 2,691 | 0.89 | 181 |
| Example 47 | 3.5 | 2,683 | 0.89 | 183 |
| Example 48 | 3.5 | 1,733 | 0.90 | 189 |
| Example 49 | 3.6 | 1,729 | 0.88 | 182 |
| Example 50 | 3.5 | 2,661 | 0.89 | 184 |
| Comparative Example 33 | 3.5 | 1,713 | 0.76 | 158 |
| Comparative Example 34 | 3.6 | 2,613 | 0.76 | 163 |
| Comparative Example 35 | 3.5 | 2,631 | 0.74 | 162 |

| Examples and Comparative Examples | Properties of magnetic recording medium | | | |
|---|---|---|---|---|
| | Surface roughness Ra (nm) | Young's modulus (relative value) | Linear absorption (μm$^{-1}$) | Surface Resistivity value (Ω/sq) |
| Example 43 | 7.8 | 142 | 1.46 | $6.7 \times 10^8$ |
| Example 44 | 7.2 | 136 | 1.38 | $3.1 \times 10^8$ |
| Example 45 | 7.0 | 142 | 1.46 | $3.2 \times 10^9$ |

TABLE 16-continued

| | | | | |
|---|---|---|---|---|
| Example 46 | 8.4 | 135 | 1.39 | $6.9 \times 10^8$ |
| Example 47 | 8.0 | 137 | 1.53 | $8.1 \times 10^8$ |
| Example 48 | 6.9 | 143 | 1.39 | $1.4 \times 10^9$ |
| Example 49 | 8.0 | 142 | 1.56 | $2.2 \times 10^8$ |
| Example 50 | 7.6 | 135 | 1.51 | $7.3 \times 10^8$ |
| Comparative Example 33 | 14.4 | 129 | 0.71 | $9.3 \times 10^{11}$ |
| Comparative Example 34 | 13.3 | 123 | 0.68 | $6.6 \times 10^{11}$ |
| Comparative Example 35 | 13.2 | 123 | 1.11 | $8.3 \times 10^{10}$ |

TABLE 17

| | Production of magnetic coating composition | |
|---|---|---|
| Examples and Comparative Examples | Kind of black plate-shaped ferrite composite particles with magnetoplumbite structure | Weight ratio of magnetic particles to resin (—) |
| Example 51 | Example 30 | 5.0 |
| Example 52 | Example 31 | 5.0 |
| Example 53 | Example 32 | 5.0 |
| Example 54 | Example 33 | 5.0 |
| Example 55 | Example 34 | 5.0 |
| Example 56 | Example 30 | 5.0 |
| Example 57 | Example 32 | 5.0 |
| Example 58 | Example 34 | 5.0 |
| Comparative Example 36 | Comparative Example 27 | 5.0 |
| Comparative Example 37 | Comparative Example 28 | 5.0 |
| Comparative Example 38 | Comparative Example 29 | 5.0 |

| Examples and Comparative Examples | Production of magnetic coating composition Amount of carbon black fine particles added (weight ratio to magnetic particles) (—) | Properties of magnetic coating composition Viscosity (cP) |
|---|---|---|
| Example 51 | 1.0 | 2,790 |
| Example 52 | 1.0 | 2,944 |
| Example 53 | 1.0 | 2,560 |
| Example 54 | 1.0 | 3,891 |
| Example 55 | 1.0 | 2,790 |
| Example 56 | 0.0 | 2,944 |
| Example 57 | 2.5 | 2,944 |
| Example 58 | 1.5 | 3,891 |
| Comparative Example 36 | 1.0 | 3,891 |
| Comparative Example 37 | 1.0 | 2,790 |
| Comparative Example 38 | 1.0 | 3,328 |

| | Properties of magnetic recording medium | | | |
|---|---|---|---|---|
| Examples and Comparative Examples | Thickness of magnetic layer (μm) | Coercive force value (Oe) | Br/Bm value (—) | Gloss (%) |
| Example 51 | 3.4 | 1,736 | 0.88 | 190 |
| Example 52 | 3.5 | 2,689 | 0.89 | 183 |
| Example 53 | 3.5 | 1,741 | 0.90 | 186 |
| Example 54 | 3.5 | 2,700 | 0.89 | 185 |
| Example 55 | 3.5 | 2,686 | 0.89 | 188 |
| Example 56 | 3.5 | 1,734 | 0.91 | 189 |
| Example 57 | 3.5 | 1,735 | 0.89 | 181 |
| Example 58 | 3.5 | 2,668 | 0.90 | 183 |

TABLE 17-continued

| | | | | |
|---|---|---|---|---|
| Comparative Example 36 | 3.4 | 1,713 | 0.78 | 160 |
| Comparative Example 37 | 3.5 | 2,615 | 0.78 | 163 |
| Comparative Example 38 | 3.5 | 2,618 | 0.76 | 160 |

| | Properties of magnetic recording medium | | | |
|---|---|---|---|---|
| Examples and Comparative Examples | Surface roughness Ra (nm) | Young's modulus (relative value) | Linear absorption (μm$^{-1}$) | Surface resistivity value (Ω/sq) |
| Example 51 | 6.4 | 145 | 1.44 | $9.3 \times 10^8$ |
| Example 52 | 8.1 | 136 | 1.32 | $2.2 \times 10^8$ |
| Example 53 | 7.7 | 144 | 1.48 | $3.6 \times 10^8$ |
| Example 54 | 7.8 | 136 | 1.45 | $1.4 \times 10^9$ |
| Example 55 | 7.5 | 136 | 1.51 | $9.6 \times 10^8$ |
| Example 56 | 7.0 | 144 | 1.44 | $1.8 \times 10^8$ |
| Example 57 | 8.1 | 144 | 1.61 | $1.1 \times 10^9$ |
| Example 58 | 7.6 | 135 | 1.52 | $7.3 \times 10^8$ |
| Comparative Example 36 | 14.4 | 130 | 0.68 | $9.3 \times 10^{11}$ |
| Comparative Example 37 | 14.0 | 125 | 0.65 | $6.6 \times 10^{11}$ |
| Comparative Example 38 | 13.6 | 125 | 1.13 | $8.3 \times 10^{10}$ |

TABLE 18

| | Production of black plate-shaped ferrite composite particles with magnetoplumbite structure Coating with fluoroalkylsilane compound Fluoroalkylsilane compound | | |
|---|---|---|---|
| Examples and Comparative Examples | Kind of core particles | Kind | Amount added (part by weight) |
| Example 59 | Core particles 1 | Tridecafluorooctyl trimethoxysilane | 2.0 |
| Example 60 | Core particles 2 | Heptadecafluorodecyl trimethoxysilane | 4.0 |
| Example 61 | Core particles 3 | Trifluoropropyl trimethoxysilane | 3.0 |
| Example 62 | Core particles 4 | Tridecafluorooctyl trimethoxysilane | 1.0 |
| Example 63 | Core particles 5 | Heptadecafluorodecyl trimethoxysilane | 5.0 |
| Comparative Example 39 | Core particles 1 | Tridecafluorooctyl trimethoxysilane | 1.0 |
| Comparative Example 40 | Core particles 2 | Tridecafluorooctyl trimethoxysilane | 0.5 |
| Comparative Example 41 | Core particles 2 | Tridecafluorooctyl trimethoxysilane | 0.005 |

| | Production of black plate-shaped ferrite composite particles with magnetoplumbite structure Coating with fluoroalkylsilane compound | | |
|---|---|---|---|
| Examples and Comparative Examples | Edge runner treatment | | Coating amount (calculated as Si) (wt. %) |
| | Linear load (Kg/cm) | Time (min) | |
| Example 59 | 60 | 30 | 0.11 |
| Example 60 | 45 | 30 | 0.19 |
| Example 61 | 30 | 45 | 0.37 |
| Example 62 | 60 | 30 | 0.06 |

TABLE 18-continued

| Examples and Comparative Examples | | | |
|---|---|---|---|
| Example 63 | 45 | 30 | 0.23 |
| Comparative Example 39 | 60 | 30 | 0.06 |
| Comparative Example 40 | 60 | 30 | 0.03 |
| Comparative Example 41 | 60 | 30 | $3 \times 10^{-4}$ |

Production of black plate-shaped ferrite composite particles with magnetoplumbite structure
Coating of carbon black fine particles

| Examples and Comparative Examples | Carbon black Kind | Amount added (part by weight) |
|---|---|---|
| Example 59 | A | 7.5 |
| Example 60 | A | 5.0 |
| Example 61 | A | 5.0 |
| Example 62 | B | 10.0 |
| Example 63 | C | 10.0 |
| Comparative Example 39 | — | — |
| Comparative Example 40 | A | 0.01 |
| Comparative Example 41 | B | 5.0 |

Production of black plate-shaped ferrite composite particles with magnetoplumbite structure
Coating of carbon black

| Examples and Comparative Examples | Edge runner treatment Linear load (Kg/cm) | Time (min) | Amount of carbon black coat (calculated as C) (wt. %) |
|---|---|---|---|
| Example 59 | 60 | 20 | 6.96 |
| Example 60 | 45 | 45 | 4.75 |
| Example 61 | 30 | 30 | 4.74 |
| Example 62 | 60 | 20 | 9.08 |
| Example 63 | 45 | 30 | 9.07 |
| Comparative Example 39 | — | — | — |
| Comparative Example 40 | 60 | 30 | 0.01 |
| Comparative Example 41 | 60 | 30 | 4.75 |

TABLE 19

Properties of black plate-shaped ferrite composite particles with magnetoplumbite structure

| Examples and Comparative Examples | Average particle size (μm) | Average thickness (μm) | Plate ratio (—) | Geometrical standard deviation value (—) |
|---|---|---|---|---|
| Example 59 | 0.050 | 0.012 | 4.2:1 | 1.35 |
| Example 60 | 0.032 | 0.009 | 3.6:1 | 1.40 |
| Example 61 | 0.050 | 0.012 | 4.2:1 | 1.35 |
| Example 62 | 0.032 | 0.009 | 3.6:1 | 1.40 |
| Example 63 | 0.032 | 0.010 | 3.2:1 | 1.40 |
| Comparative Example 39 | 0.050 | 0.012 | 4.2:1 | 1.35 |
| Comparative Example 40 | 0.032 | 0.009 | 3.6:1 | — |
| Comparative Example 41 | 0.032 | 0.009 | 3.6:1 | — |

Properties of black plate-shaped ferrite composite particles with magnetoplumbite structure

| Examples and Comparative Examples | BET specific surface area value (m²/g) | Coercive force value (Oe) | Saturation magnetization value (emu/g) |
|---|---|---|---|
| Example 59 | 46.1 | 1,711 | 53.0 |
| Example 60 | 59.1 | 2,586 | 48.6 |
| Example 61 | 45.5 | 1,713 | 51.6 |
| Example 62 | 58.6 | 2,577 | 48.3 |
| Example 63 | 59.1 | 2,588 | 48.1 |
| Comparative Example 39 | 47.3 | 1,708 | 54.3 |
| Comparative Example 40 | 58.3 | 2,584 | 49.1 |
| Comparative Example 41 | 62.1 | 2,583 | 48.3 |

Properties of black plate-shaped ferrite composite particles with magnetoplumbite structure

| Examples and Comparative Examples | Volume resistivity value (Ω·cm) | Blackness (L* value) (—) | Carbon black desorption percentage (%) | Thickness of carbon black coat (μm) |
|---|---|---|---|---|
| Example 59 | $2.6 \times 10^6$ | 22.2 | 3.9 | 0.0023 |
| Example 60 | $7.9 \times 10^6$ | 24.1 | 4.8 | 0.0022 |
| Example 61 | $1.3 \times 10^6$ | 21.2 | 1.6 | 0.0022 |
| Example 62 | $6.1 \times 10^6$ | 24.1 | 6.9 | 0.0024 |
| Example 63 | $2.8 \times 10^6$ | 23.8 | 2.3 | 0.0024 |
| Comparative Example 39 | $7.6 \times 10^9$ | 33.6 | — | — |
| Comparative Example 40 | $1.2 \times 10^9$ | 30.1 | — | — |
| Comparative Example 41 | $6.5 \times 10^7$ | 28.5 | 46.3 | — |

Properties of black plate-shaped ferrite composite particles with magnetoplumbite structure

| Examples and Comparative Examples | Percentage of change in coercive force value (%) | $Fe^{2+}/Fe^{3+}$ (—) |
|---|---|---|
| Example 59 | 0.0 | 0.0 |
| Example 60 | 0.0 | 0.0 |
| Example 61 | 0.0 | 0.0 |
| Example 62 | 0.0 | 0.0 |
| Example 63 | 0.0 | 0.0 |
| Comparative Example 39 | 0.0 | 0.0 |
| Comparative Example 40 | 0.0 | 0.0 |
| Comparative Example 41 | 0.0 | 0.0 |

TABLE 20

| Examples and Comparative Examples | Production of magnetic coating composition | |
|---|---|---|
| | Kind of black plate-shaped ferrite composite particles with magnetoplumbite structure | Weight ratio of magnetic particles to resin (-) |
| Example 64 | Example 59 | 5.0 |
| Example 65 | Example 60 | 5.0 |
| Example 66 | Example 61 | 5.0 |
| Example 67 | Example 62 | 5.0 |
| Example 68 | Example 63 | 5.0 |
| Example 69 | Example 59 | 5.0 |
| Example 70 | Example 61 | 5.0 |
| Example 71 | Example 63 | 5.0 |
| Comparative Example 42 | Comparative Example 39 | 5.0 |
| Comparative Example 43 | Comparative Example 40 | 5.0 |
| Comparative Example 44 | Comparative Example 41 | 5.0 |

| Examples and Comparative Examples | Production of magnetic coating composition Amount of carbon black fine particles added (weight ratio to magnetic particles) (-) | Properties of magnetic coating composition Viscosity (cP) |
|---|---|---|
| Example 64 | 1.0 | 2,790 |
| Example 65 | 1.0 | 3,891 |
| Example 66 | 1.0 | 2,560 |
| Example 67 | 1.0 | 2,944 |
| Example 68 | 1.0 | 2,790 |
| Example 69 | 0.0 | 2,944 |
| Example 70 | 2.5 | 3,738 |
| Example 71 | 1.5 | 3,866 |
| Comparative Example 42 | 1.0 | 2,560 |
| Comparative Example 43 | 1.0 | 3,866 |
| Comparative Example 44 | 1.0 | 2,944 |

| Examples and Comparative Examples | Properties of magnetic recording medium | | | |
|---|---|---|---|---|
| | Thickness of magnetic layer ($\mu$m) | Coercive force value (Oe) | Br/Bm value (-) | Gloss (%) |
| Example 64 | 3.5 | 1,731 | 0.89 | 182 |
| Example 65 | 3.5 | 2,683 | 0.89 | 183 |
| Example 66 | 3.5 | 1,726 | 0.89 | 183 |
| Example 67 | 3.4 | 2,668 | 0.89 | 186 |
| Example 68 | 3.5 | 2,662 | 0.89 | 188 |
| Example 69 | 3.5 | 1,733 | 0.89 | 190 |
| Example 70 | 3.5 | 1,733 | 0.88 | 186 |
| Example 71 | 3.5 | 2,648 | 0.88 | 186 |
| Comparative Example 42 | 3.5 | 1,708 | 0.78 | 158 |
| Comparative Example 43 | 3.6 | 2,613 | 0.78 | 160 |
| Comparative Example 44 | 3.5 | 2,620 | 0.74 | 160 |

| Examples and Comparative Examples | Properties of magnetic recording medium | | | |
|---|---|---|---|---|
| | Surface roughness Ra (nm) | Young's modulus (relative value) | Linear absorption ($\mu$m$^{-1}$) | Surface resistivity value ($\Omega$/sq) |
| Example 64 | 7.8 | 144 | 1.48 | $2.2 \times 10^8$ |
| Example 65 | 8.1 | 135 | 1.36 | $7.1 \times 10^8$ |
| Example 66 | 8.3 | 142 | 1.49 | $3.4 \times 10^8$ |
| Example 67 | 8.0 | 135 | 1.42 | $2.8 \times 10^9$ |
| Example 68 | 7.6 | 135 | 1.36 | $9.6 \times 10^8$ |
| Example 69 | 7.2 | 141 | 1.39 | $2.2 \times 10^9$ |
| Example 70 | 8.1 | 143 | 1.58 | $1.3 \times 10^8$ |
| Example 71 | 8.5 | 135 | 1.41 | $8.9 \times 10^8$ |
| Comparative Example 42 | 14.4 | 129 | 0.63 | $7.6 \times 10^{11}$ |
| Comparative Example 43 | 13.9 | 123 | 0.62 | $8.1 \times 10^{11}$ |
| Comparative Example 44 | 13.7 | 120 | 1.15 | $6.5 \times 10^{10}$ |

Example 72

<Production of Non-magnetic Substrate: Formation of Non-magnetic Undercoat Layer on Non-magnetic Base Film>

12 g of the spindle-shaped hematite particles (average major axial diameter: 0.151 $\mu$m, average minor axial diameter: 0.0228 $\mu$m, aspect ratio: 6.6:1, BET specific surface area: 53.4 m$^2$/g, geometrical standard deviation: 1.36) were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene= 1:1)), cyclohexanone, methyl ethyl ketone and toluene, and the obtained mixture was mixed and dispersed by a paint shaker for 6 hours to obtain a non-magnetic coating composition. The viscosity of the obtained coating film composition was 435 cP.

The thus-obtained non-magnetic coating composition containing the spindle-shaped hematite particles was as follows:

| | |
|---|---|
| Spindle-shaped hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The non-magnetic coating composition obtained was applied to a polyethylene terephthalate film of 12 $\mu$m thick to a thickness of 55 $\mu$m by an applicator, and the coating film was then dried, thereby forming a non-magnetic undercoat layer. The thickness of the non-magnetic undercoat layer was 3.5 $\mu$m.

The non-magnetic undercoat layer produced from the spindle-shaped hematite particles as the non-magnetic particles had a gloss of 196%, and a surface roughness Ra of 7.2 nm. The Young's modulus (relative value) thereof was 122.

<Production of Magnetic Recording Medium: Formation of Magnetic Recording Layer>

12 g of the black plate-shaped ferrite composite particles with magnetoplumbite structure obtained in Example 1, 1.2 g of a polishing agent (AKP-50: trade name, produced by Sumitomo Chemical Co., Ltd.), 0.06 g of carbon black fine particles (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene 1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Black plate-shaped ferrite composite particles with magnetoplumbite structure | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-50) | 10 parts by weight |
| Carbon black fine particles (#3250B) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 64.9 parts by weight |
| Methyl ethyl ketone | 162.2 parts by weight |
| Toluene | 97.3 parts by weight |

The viscosity of the obtained magnetic coating composition was 2,820 cP.

The magnetic coating composition obtained was applied to the non-magnetic undercoat layer to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 1.0 μm.

The coercive force value of the magnetic tape produced by forming a magnetic recording layer on the non-magnetic undercoat layer was 2,128 Oe, the squareness (Br/Bm) thereof was 0.89, the gloss thereof was 200%, the linear absorption coefficient thereof was 1.86 μm$^{-1}$, the surface resistivity was 3.6×10$^8$ Ω/sq, the surface roughness Ra thereof was 6.6 nm, and the Young's modulus (relative value) thereof was 138.

What is claimed is:

1. Black plate-shaped ferrite composite particles with magnetoplumbite structure, having an average particle size of 0.01 to 0.2 μm, comprising:
    plate-shaped ferrite particles with magnetoplumbite structure;
    a coating layer formed on the surface of said plate-shaped ferrite particles with magnetoplumbite structure, comprising at least one organosilicon compound selected from the group consisting of:
    (1) organosilane compounds obtainable from an alkoxysilane compounds,
    (2) polysiloxanes or modified polysiloxanes, and
    (3) fluoroalkyl organosilane compounds obtainable from a fluoroalkylsilane compounds; and
    a carbon black coating formed on said organosilicon coating layer, in an amount of 0.5 to 10 parts by weight based on 100 parts by weight of said plate-shaped ferrite particles with magnetoplumbite structure.

2. Black plate-shaped ferrite composite particles with magnetoplumbite structure according to claim 1, wherein said plate-shaped ferrite particles with magnetoplumbite structure are core particles having a coating layer comprising at least one compound selected from the group consisting of hydroxides of aluminum, oxides of aluminum, hydroxides of silicon and oxides of silicon in an amount of 0.01 to 20% by weight, calculated as Al or SiO$_2$, based on the total weight of the coated plate-shaped ferrite composite particles with magnetoplumbite structure,
    the oxide or hydroxide coating being formed on at least part of the surface of the plate-shaped ferrite particles with magnetoplumbite structure, and between the organosilicon coating layer and the surface of the plate-shaped ferrite particle with magnetoplumbite structure.

3. Black plate-shaped ferrite composite particles with magnetoplumbite structure according to claim 1, wherein said modified polysiloxanes are selected from the group consisting of:
    (A) polysiloxanes modified with at least one compound selected from the group consisting of polyethers, polyesters and epoxy compounds, and
    (B) polysiloxanes whose molecular terminal is modified with at least one group selected from the group consisting of carboxylic acid groups, alcohol groups and hydroxyl groups.

4. Black plate-shaped ferrite composite particles with magnetoplumbite structure according to claim 1, wherein said fluoroalkylsilane compounds are represented by the general formula (VII):

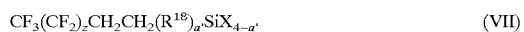

$$CF_3(CF_2)_zCH_2CH_2(R^{18})_{a'}SiX_{4-a'}$$ (VII)

wherein R$^{18}$ is CH$_3$—, C$_2$H$_5$—, CH$_3$O— or C$_2$H$_5$O—; X is CH$_3$O— or C$_2$H$_5$O—; z is an integer from 0 to 15; and a' is an integer from 0 to 3.

5. Black plate-shaped ferrite composite particles with magnetoplumbite structure according to claim 1, wherein the amount of said coating organosilicon compounds is 0.02 to 5.0% by weight, calculated as Si, based on the total weight of the organosilicon compounds and plate-shaped ferrite particles with magnetoplumbite structure.

6. Black plate-shaped ferrite composite particles with magnetoplumbite structure according to claim 1, wherein the carbon black coating is obtained by mixing carbon black fine particles having a particle size of 0.002 to 0.05 μm with the organosilicon-coated plate-shaped ferrite particles while applying a shear force.

7. Black plate-shaped ferrite composite particles with magnetoplumbite structure according to claim 1, wherein the thickness of said carbon black coating is not more than 0.04 μm.

8. Black plate-shaped ferrite composite particles with magnetoplumbite structure according to claim 1, which particles have an average thickness of 0.0005 to 0.05 μm and an average plate ratio (plate surface diameter:thickness) of 2.0:1 to 20.0:1.

9. Black plate-shaped ferrite composite particles with magnetoplumbite structure according to claim 1, wherein said particles have a BET specific surface area value of 30 to 200 m$^2$/g.

10. Black plate-shaped ferrite composite particles with magnetoplumbite structure according to claim 1, which particles have a geometrical standard deviation of the plate surface diameter of 1.01 to 1.7.

11. Black plate-shaped ferrite composite particles with magnetoplumbite structure according to claim 1, which particles have a volume resistivity of less than $1.0 \times 10^8$ Ωcm.

12. Black plate-shaped ferrite composite particles with magnetoplumbite structure according to claim 1, which particles have a blackness (L*value) of 15 to 27.

13. Black plate-shaped ferrite composite particles with magnetoplumbite structure according to claim 1, which particles have a coercive force of 500 to 4000 Oe and a saturation magnetization value of 40 to 70 emu/g.

14. Black plate-shaped ferrite composite particles with magnetoplumbite structure according to claim 1, wherein said alkoxysilane compound is represented by the general formula (I):

$$R^1_a SiX_{4-a} \tag{I}$$

wherein $R^1$ is $C_6H_5$—, $(CH_3)_2CHCH_2$— or n-$C_bH_2$+1— wherein b is an integer from 1 to 18; X is $CH_3O$— or $C_2H_5O$—; and a is an integer from 0 to 3.

15. Black plate-shaped ferrite composite particles with magnetoplumbite structure according to claim 14, wherein said alkoxysilane compound is methyl triethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, isobutyl trimethoxysilane or decyl trimethoxysilane.

16. Black plate-shaped ferrite composite particles with magnetoplumbite structure according to claim 14, wherein said polysiloxanes modified with at least one compound selected from the group consisting of polyethers, polyesters and epoxy compounds are represented by the general formula (III), (IV) or (V):

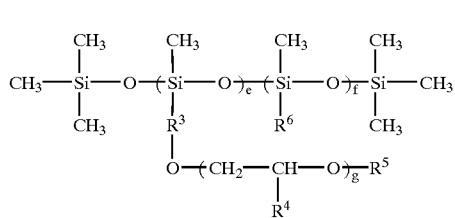

wherein $R^3$ is —($CH_2$—)$_h$—; $R^4$ is —($CH_2$—)$_i$—$CH_3$; $R^5$ is —OH, —COOH, —CH=$CH_2$, —C($CH_3$)=$CH_2$ or —($CH_2$—)$_j$—$CH_3$; $R^6$ is —($CH_2$—)$_k$—$CH_3$; g and h are integers from 1 to 15; i, j and k are integers from 0 to 15; e is an integer from 1 to 50; and f is an integer from 1 to 300;

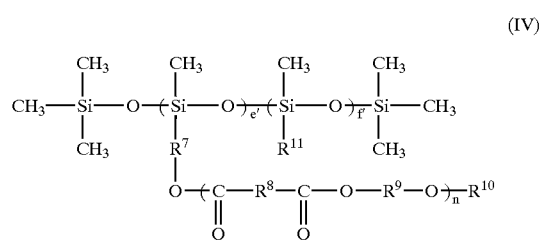

wherein $R^7$, $R^8$ and $R^9$ are —($CH_2$—)$_q$— and may be the same or different; $R^{10}$ is —OH, —COOH, —CH=$CH_2$, —C($CH_3$)=$CH_2$ or —($CH_2$—)$_r$—$CH_3$; $R^{11}$ is —($CH_2$—)$_s$—$CH_3$; n and q are an integer from 1 to 15; r and s are an integer from 0 to 15; e' is an integer from 1 to 50; and f' is an integer from 1 to 300; or

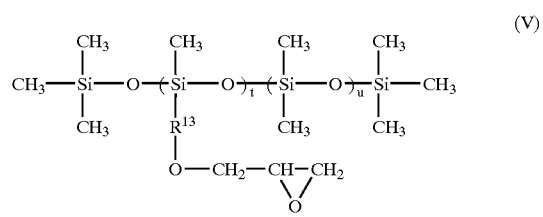

wherein $R^{12}$ is —($CH_2$—)$_v$—; v is an integer from 1 to 15; t is an integer from 1 to 50; and u is an integer from 1 to 300.

17. Black plate-shaped ferrite composite particles with magnetoplumbite structure according to claim 14, wherein said polysiloxanes whose molecular terminal is modified with at least one group selected from the group consisting of carboxylic acid groups, alcohol groups and a hydroxyl group are represented by the general formula (VI):

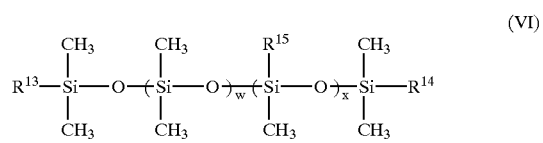

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —($CH_2$—)$_y$—; y is an integer from 1 to 15; w is an integer from 1 to 200; and x is an integer from 0 to 100.

18. Black plate-shaped ferrite composite particles with magnetoplumbite structure according to claim 1, wherein said polysiloxanes are represented by the general formula (II):

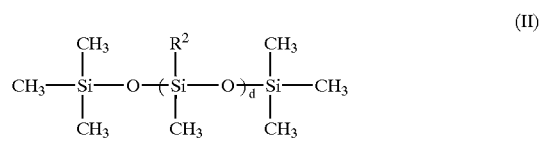

wherein $R^2$ is H— or $CH_3$—, and d is an integer from 15 to 450.

19. Black plate-shaped ferrite composite particles with magnetoplumbite structure according to claim 18, wherein said polysiloxanes are ones having methyl hydrogen siloxane units.

20. Black plate-shaped ferrite composite particles with magnetoplumbite structure, having an average particle size of 0.01 to 0.2 μm and a volume resistivity of less than 1.0×10⁸ Ω·cm, comprising:

plate-shaped ferrite particles with magnetoplumbite structure;

a coating layer formed on the surface of said plate-shaped ferrite particles with magnetoplumbite structure, comprising at least one organosilicon compound selected from the group consisting of:
  (1) organosilane compounds obtainable from an alkoxysilane compounds,
  (2) polysiloxanes or modified polysiloxanes, and
  (3) fluoroalkyl organosilane compounds obtainable from a fluoroalkylsilane compounds; and
    a carbon black coat formed on said coating layer comprising said organosilicon compound, in an amount of 0.5 to 10 parts by weight based on 100 parts by weight of said plate-shaped ferrite particles with magnetoplumbite structure.

21. A magnetic recording medium having a surface resistivity of not more than 1.0×10¹⁰ Ω/sq, comprising:

a non-magnetic substrate; and a magnetic recording layer comprising a binder resin and the black plate-shaped ferrite composite particles with magnetoplumbite structure defined in claim 20.

22. Black plate-shaped ferrite composite particles with magnetoplumbite structure, having an average particle size of 0.01 to 0.2 μm and a blackness (L*value) of 15 to 27, comprising:

plate-shaped ferrite particles with magnetoplumbite structure;

a coating layer formed on the surface of said plate-shaped ferrite particles with magnetoplumbite structure, comprising at least one organosilicon compound selected from the group consisting of:
  (1) organosilane compounds obtainable from an alkoxysilane compounds,
  (2) polysiloxanes or modified polysiloxanes, and
  (3) fluoroalkyl organosilane compounds obtainable from a fluoroalkylsilane compounds; and
    a carbon black coat formed on said coating layer comprising said organosilicon compound, in an amount of 0.5 to 10 parts by weight based on 100 parts by weight of said plate-shaped ferrite particles with magnetoplumbite structure.

23. Black plate-shaped ferrite composite particles with magnetoplumbite structure according to claim 22, which further have a volume resistivity of less than 1.0×10⁸ Ω·cm.

24. A magnetic recording medium having a surface resistivity of not more than 1.0×10¹⁰ Ω/sq, comprising:

a non-magnetic substrate; and a magnetic recording layer comprising a binder resin and the black plate-shaped ferrite composite particles with magnetoplumbite structure defined in claim 22.

25. A magnetic recording medium comprising:

a non-magnetic substrate; and a magnetic recording layer comprising a binder resin and the black plate-shaped ferrite composite particles with magnetoplumbite structure having an average particle size of 0.01 to 0.2 μm, comprising:
    plate-shaped ferrite particles with magnetoplumbite structure;
    a coating layer formed on the surface of said plate-shaped ferrite particles with magnetoplumbite structure, comprising at least one organosilicon compound selected from the group consisting of:
    (1) organosilane compounds obtainable from an alkoxysilane compounds,
    (2) polysiloxanes or modified polysiloxanes, and
    (3) fluoroalkyl organosilane compounds obtainable from a fluoroalkylsilane compounds; and
      a carbon black coating formed on said organosilicon coating layer, in an amount of 0.5 to 10 parts by weight based on 100 parts by weight of said plate-shaped ferrite particles with magnetoplumbite structure.

26. A magnetic recording medium according to claim 25, which further has a coercive force of 500 to 4000 Oe and a squareness (residual magnetic flux density Br/saturation magnetic flux density Bm) of 0.82 to 0.95.

27. A magnetic recording medium according to claim 25, which further has a gloss of 165 to 300%, a surface roughness Ra of not more than 12.0 nm, and a linear absorption coefficient of coating film of 1.20 to 10.0 μm−1.

28. A magnetic recording medium according to claim 25, which further has a surface resistivity of not more than 1.0×10¹⁰ Ω/sq.

29. A magnetic recording medium according to claim 25, wherein said plate-shaped ferrite particles with magnetoplumbite structure as core particles have a coating comprising at least one compound selected from the group consisting of hydroxides of aluminum, oxides of aluminum, hydroxides of silicon and oxides of silicon in an amount of 0.01 to 20% by weight, calculated as Al or SiO2, based on the total weight of the coated plate-shaped ferrite composite particles with magnetoplumbite structure, the coating being formed on at least a part of the surface of the plate-shaped ferrite particles with magnetoplumbite structure, and between the coating layer comprising at least one organosilicon compound and the surface of the plate-shaped ferrite particle with magnetoplumbite structure.

30. A magnetic recording medium having a surface resistivity of not more than 1.0×10¹⁰ Ω/sq, comprising:

a non-magnetic substrate; and a magnetic recording layer comprising a binder resin and the black plate-shaped ferrite composite particles with magnetoplumbite plate-shaped ferrite particles with magnetoplumbite structure;

a coating layer formed on the surface of said plate-shaped ferrite particles with magnetoplumbite structure, comprising at least one organosilicon compound selected from the group consisting of:
  (1) organosilane compounds obtainable from an alkoxysilane compounds,
  (2) polysiloxanes or modified polysiloxanes, and
  (3) fluoroalkyl organosilane compounds obtainable from a fluoroalkylsilane compounds; and
    a carbon black coating formed on said organosilicon coating layer, in an amount of 0.5 to 10 parts by weight based on 100 parts by weight of said plate-shaped ferrite particles with magnetoplumbite structure.

* * * * *